(12) United States Patent
Iwase et al.

(10) Patent No.: US 8,382,195 B2
(45) Date of Patent: Feb. 26, 2013

(54) VEHICLE BODY FORWARD PORTION STRUCTURE

(75) Inventors: Makoto Iwase, Toyota (JP); Takayuki Oidemizu, Toyota (JP); Yoshiteru Inamoto, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 240 days.

(21) Appl. No.: 13/060,368

(22) PCT Filed: Dec. 22, 2008

(86) PCT No.: PCT/JP2008/073278
§ 371 (c)(1),
(2), (4) Date: Feb. 23, 2011

(87) PCT Pub. No.: WO2010/073303
PCT Pub. Date: Jul. 1, 2010

(65) Prior Publication Data
US 2011/0156446 A1 Jun. 30, 2011

(51) Int. Cl.
*B62D 25/04* (2006.01)
(52) U.S. Cl. ......... 296/187.12; 296/193.02; 296/193.05; 296/193.06; 296/203.03; 296/30
(58) Field of Classification Search ............ 296/187.12, 296/193.02, 193.05, 193.06, 202, 203.03, 296/30, 146.11
See application file for complete search history.

(56) References Cited

U.S. PATENT DOCUMENTS

| 5,586,799 | A | 12/1996 | Kanemitsu | |
|---|---|---|---|---|
| 6,702,368 | B1* | 3/2004 | Hanyu | 296/193.06 |
| 7,798,562 | B2* | 9/2010 | Wrobel et al. | 296/193.02 |
| 7,862,108 | B2* | 1/2011 | Tamakoshi | 296/203.03 |
| 2006/0097533 | A1* | 5/2006 | Watanabe et al. | 296/30 |
| 2008/0143147 | A1* | 6/2008 | Lee | 296/193.06 |
| 2010/0289296 | A1* | 11/2010 | Brancheriau | 296/193.02 |

FOREIGN PATENT DOCUMENTS

| JP | 62-199565 A | 9/1987 |
|---|---|---|
| JP | 63-108870 | 7/1988 |
| JP | 2-141531 U | 11/1990 |
| JP | 10-226358 A | 8/1998 |
| JP | 2002-337740 A | 11/2002 |
| JP | 2007-331571 A | 12/2007 |
| JP | 2008-105561 A | 5/2008 |

OTHER PUBLICATIONS

Supplementary EP Search Report issued May 7, 2012 in EP 08 87 9101.

* cited by examiner

*Primary Examiner* — Jason S Morrow
(74) *Attorney, Agent, or Firm* — Kenyon & Kenyon LLP

(57) ABSTRACT

A vehicle body forward portion structure is provided that can ensure necessary strength and reduce the weight of a front pillar portion. In vehicle body forward portion structure, front pillar lower is formed in an overall open cross section shape that opens inward in a vehicle width direction as seen in plan sectional view as a result of front pillar outer portion being joined to pillar reinforcement lower formed from high-tensile steel plate.

16 Claims, 17 Drawing Sheets

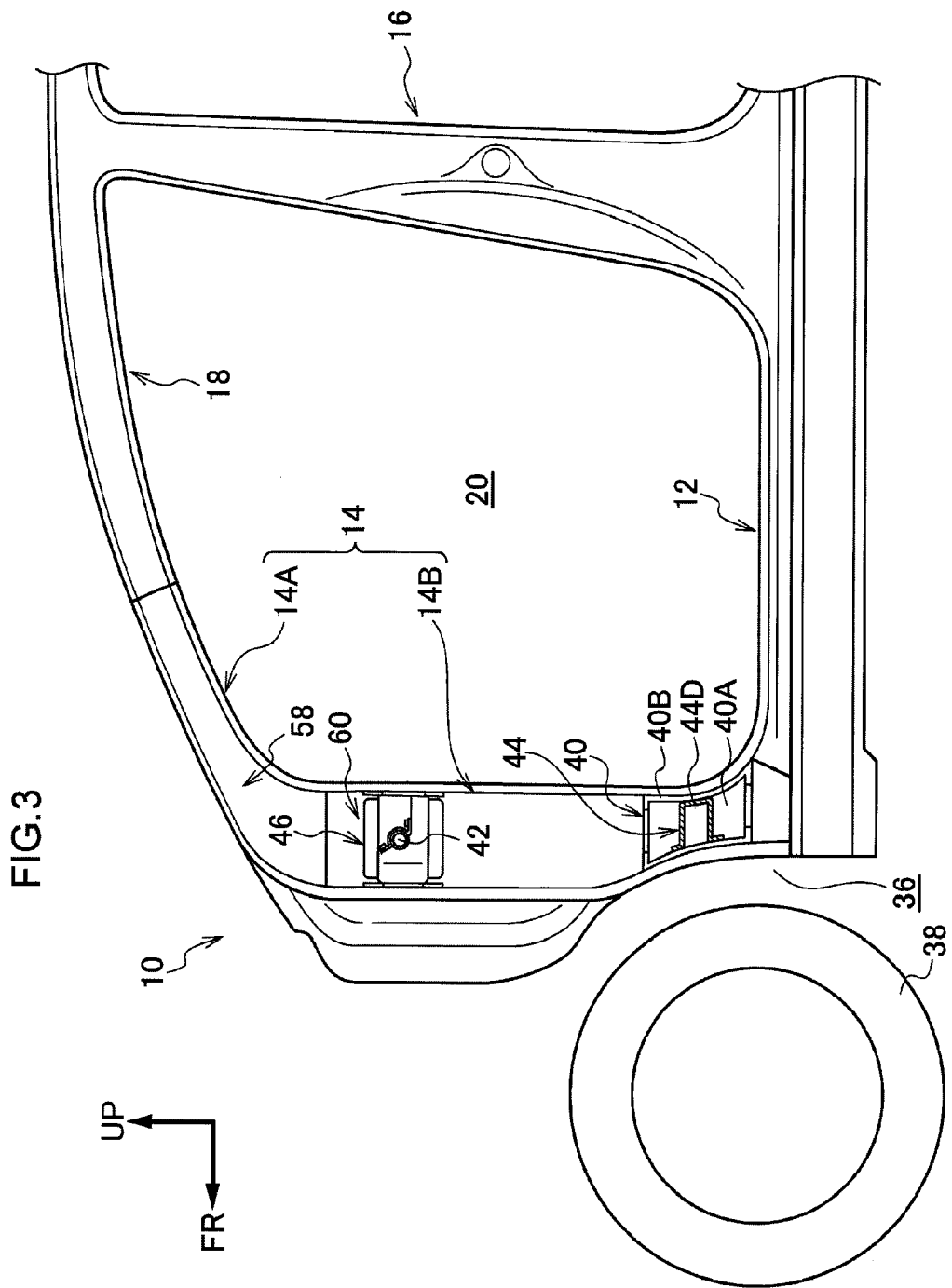

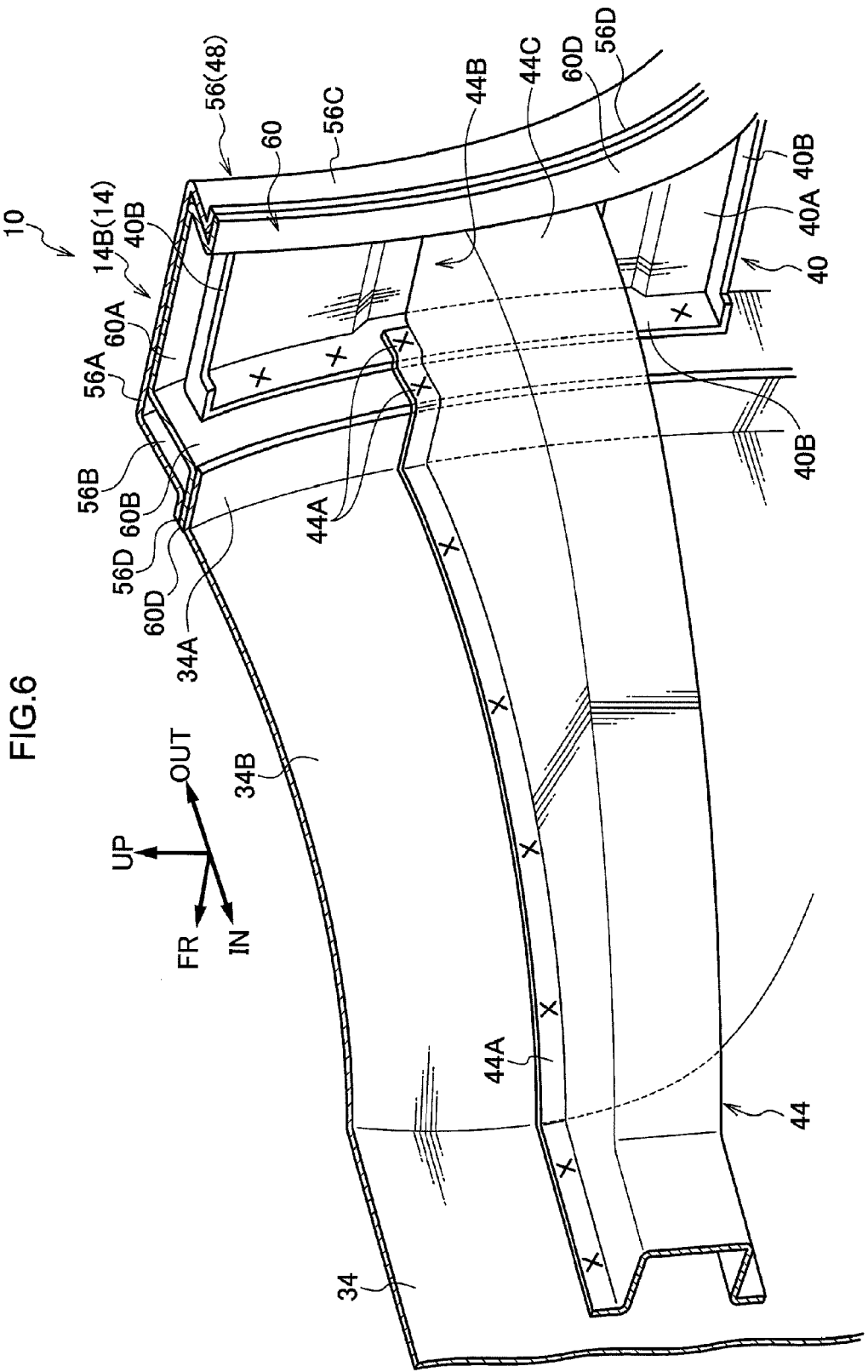

VEHICLE BODY FORWARD PORTION STRUCTURE

This is a 371 national phase application of PCT/JP2008/073278 filed 22 Dec. 2008, the content of which is incorporated herein by reference.

TECHNICAL FIELD

The present invention relates to a structure for a forward portion of a vehicle body that includes at least a lower portion of a front pillar.

RELATED ART

In Japanese Patent Application Laid-Open (JP-A) No. 10-226358, a configuration is described in which a front pillar lower portion is formed from three members such that a front pillar outer and a front pillar inner form a closed cross section, within which a door hinge brace is provided.

Further, in Japanese Utility Model Application Laid-Open (JP-U) No. 63-108870, a configuration is described in which an opening is provided in a front pillar inner, and the front pillar inner as well as the front pillar outer are connected with an instrument panel reinforcement via a connecting member that passes through the opening. In addition, in U No. 2-141531, a configuration is described in which an extension portion of a door open stopper reinforcement is projected from within a closed cross section formed by a front pillar outer and a front pillar inner through an opening provided in the front pillar inner, and the extension portion is connected to an instrument panel reinforcement.

In addition, in JP-A No. 2008-105561, a configuration is described in which the outer end in a vehicle width direction of a dash cross and a front pillar are connected by a pillar brace that is fixed thereto by a bolt fastening.

Furthermore, in JP-A No. 2002-337740, a configuration is described in which the outer end in a vehicle width direction of a dash panel is joined to a step portion that extends in a vehicle width direction and is formed at an inner wall of a front pillar inner.

DISCLOSURE OF THE INVENTION

Subject to be Addressed by the Invention

However, in the examples of a front pillar having a closed cross section configured by three members, the number of parts is large and the weight of a vehicle may be increased. Further, there are cases when welding cannot be used at certain portions in order to join other members to a front pillar that forms a three-member closed cross section configuration. In addition, each of the other examples described above is merely a configuration that requires a front pillar to have a closed cross section configuration In the present invention, a vehicle body forward portion structure that can ensure the necessary strength and can lighten the front pillar portion is obtained.

Means for Addressing the Subject

A vehicle body forward portion structure according to a first aspect of the present invention is formed in an overall open cross section shape that opens inward in a vehicle width direction as seen in plan sectional view, at least a lower part of a front pillar in a vehicle vertical direction including a high-strength portion that is configured by high-tensile steel plate and that extends in the vehicle vertical direction.

According to the above aspect, since the front pillar is configured to include a high-strength portion formed from high-tensile steel plate, a front pillar that ensures the necessary degree of strength can be configured with a small number of parts.

In this way, in the vehicle body forward portion structure according to the above aspect, the necessary degree of strength can be secured and the weight of the front pillar portion can be reduced. Further, since the front pillar is formed with an open cross section structure that opens inward in a vehicle width direction as seen in plan sectional view (sectional view orthogonal to the longitudinal direction), the position of the centroid is further outward in the vehicle width direction than in the case of a closed cross section structure. As a result, the centroid of the front pillar is closer in the vehicle width direction with respect to the centroid of the side door, which closes the opening in the vehicle body of which the front pillar forms the front edge. Therefore, in the present vehicle body forward portion structure, when vehicle rearward load is transmitted from the front pillar to the side door, bending moment acting on the side door due to the load is reduced.

In the above aspect, a configuration may be adopted in which the high-strength portion of the front pillar is formed in a sectional shape that opens inward in the vehicle width direction as seen in plan sectional view.

According to the above aspect, since the high-strength portion itself which is formed from the high-tensile steel plate has an open cross section structure that opens inward in a vehicle width direction, the overall structure of the front pillar can be simplified.

In the above aspect, a configuration may be adopted that further includes a cross member that extends in the vehicle width direction and spans between the high-strength portions of the front pillars positioned at either side in the vehicle width direction.

According to the above aspect, since the high-strength portions of the front pillars positioned at either side in the vehicle width direction are either directly or indirectly linked by the cross member, the torsional rigidity of the open cross section portion of the front pillars is secured. Note that, at least the lower portion of the open cross section portion of the front pillars is configured to include the high-strength portion, and the cross member spans between the high-strength portions forming the lower portions of the open cross section portions, even more favorable torsional rigidity of the front pillars can be secured by the cross member.

In the above aspect, a configuration may be adopted that further includes a front-rear load transmission member that is provided between wall portions that are opposed in a vehicle front-rear direction in an open cross section portion of the front pillars positioned at either side in the vehicle width direction and that is capable of transmitting load in the vehicle front-rear direction, the cross member being an inner panel reinforcement member having each end thereof in the vehicle width direction connected to the high-strength portion via the front-rear load transmission member.

According to the above aspect, since the front-rear load transmission member is provided between wall portions that are opposed in a vehicle front-rear direction in an open cross section portion of the front pillars, the open cross section portion of the front pillars can easily maintain its cross section with respect to input from the front of the vehicle. As a result, load from the front of the vehicle can easily be transmitted from the front pillars to the side doors. Further, since the inner panel reinforcement member is connected to the high-strength portions of the front pillars via the front-rear load transmission members, which are inserted into the open cross section portions, load input to one front pillar in a vehicle rearward direction is favorably transmitted to the other front pillar side via the inner panel reinforcement member.

In the above aspect, a configuration may be adopted in which the cross member is provided at a dash panel positioned between the front pillars at either side in the vehicle width direction and the cross member is a dash cross member having each end thereof in the vehicle width direction connected to the high-strength portion inside the open cross section portion of the front pillars.

According to the above aspect, because the dash cross member is directly connected to the high-strength portions of the front pillars, load input to the dash cross member in a vehicle rearward direction is efficiently transmitted to the front pillars. Further, because the high-strength portions at either side in the vehicle width direction are spanned by the dash cross member, which has its ends in the vehicle width direction inserted into the open cross section portions, load input to one front pillar in a vehicle rearward direction is favorably transmitted to the other front pillar side via the inner panel reinforcement member.

In the above aspect, a configuration may be adopted in which the cross member includes: a dash cross member provided at a dash panel positioned between the front pillars at either side in the vehicle width direction; and a pair of connecting members, each having one end connected to an outer end in the vehicle width direction of the dash cross member and another end connected to the high-strength portion inside the open cross section portion of the front pillars.

According to the above aspect, because the dash cross member is connected to the high-strength portions of the front pillars via the connecting members, load input to the dash cross member in a vehicle rearward direction is efficiently transmitted to the front pillars. Further, because the high-strength portions at either side in the vehicle width direction are spanned by the dash cross member and the connecting members, the end portions in the vehicle width direction of the connecting members are inserted into the open cross section portions, load input to one front pillar in a vehicle rearward direction is favorably transmitted to the other front pillar side via the inner panel reinforcement member.

In the above aspect, a configuration may be adopted in which both ends in the vehicle width direction of the cross member are configured to fill the open cross section portion of the front pillars at the vehicle rear side of a wheel house so as to be capable of transmitting load in the vehicle front-rear direction.

According to the above aspect, because the outer ends in the vehicle width direction of the cross member or the connecting members fill the open cross section portion of the front pillars, the cross section of the open cross section portion of the front pillars can be easily maintained with respect to input from the wheel house side. As a result, load from the vehicle front can be favorably transmitted from the front pillars to the vehicle body frame portion positioned toward the vehicle rear side.

In the above aspect, a configuration may be adopted that further includes: a door hinge that is provided at an outer side of the front pillar in the vehicle width direction and that supports a side door; a fixed member that fixes the door hinge to the front pillar and that projects inside the open cross section portion of the front pillar; and a load transmission member that is provided at the vehicle rear side of the door hinge and at the vehicle front side of a door reinforcement member in the side door. The load transmission member overlaps the door hinge and the door reinforcement member in the vehicle width direction and the vehicle vertical direction, respectively, and both ends in the vehicle width direction of the cross member are configured to fill an each space between a front wall of the front pillar and the fixed member so as to be capable of transmitting load in the vehicle front-rear direction. The front wall is positioned at a front side in the vehicle front-rear direction of the open cross section portion of the front pillar.

According to the above aspect, load input at the front pillar toward the vehicle rear side is transmitted to a door reinforcement member of the side door via the front wall of the open cross section portion, the outer ends in the vehicle width direction of the cross member or the connecting members, the fixed member, the door hinge and the load transmission member. As a result, at the lower portion of the open cross section portion forming at least the lower portion of the front pillar, a route that efficiently transmits load from the vehicle front side to the side door is secured.

In the above aspect, a configuration may be adopted in which a wall portion of the front pillar that extends in the vehicle width direction is joined to an outer end portion in the vehicle width direction of the dash panel.

According to the above aspect, the joint portion of the dash panel and the front pillar can receive load accompanying vehicle body deformation in a direction that would topple the front pillar in the vehicle width direction, as shear load. As a result, vehicle body rigidity with respect to vehicle body deformation in a direction that would topple the front pillar in the vehicle width direction is improved as compared to a configuration in which the above load acts as detachment load at the joint portion of the dash panel and the front pillar.

In the above aspect, a configuration may be adopted in which the wall portion that extends in the vehicle width direction and is joined to an outer end portion in the vehicle width direction of the dash panel is a wall portion that is a component of the high-strength portion.

According to the above aspect, since the dash panel is directly joined to the high-strength portion, vehicle body rigidity with respect to vehicle body deformation in a direction that would topple the front pillar in the vehicle width direction can be improved even further.

Effect of the Invention

The vehicle body forward portion structure according to the invention as explained above has an exceptional effect whereby it can ensure the necessary strength and can lighten the front pillar portion.

BRIEF DESCRIPTION OF THE DRAWINGS

FIG. 3 is a lateral view showing the general configuration of the vehicle body forward portion structure according to a first embodiment of the present invention;

FIG. 6 is a perspective view showing a joining configuration to a pillar reinforcement lower of a dash cross member that is a component of the vehicle body forward portion structure according to a first embodiment of the present invention;

BEST MODE FOR PRACTICING THE INVENTION

Figure 1:
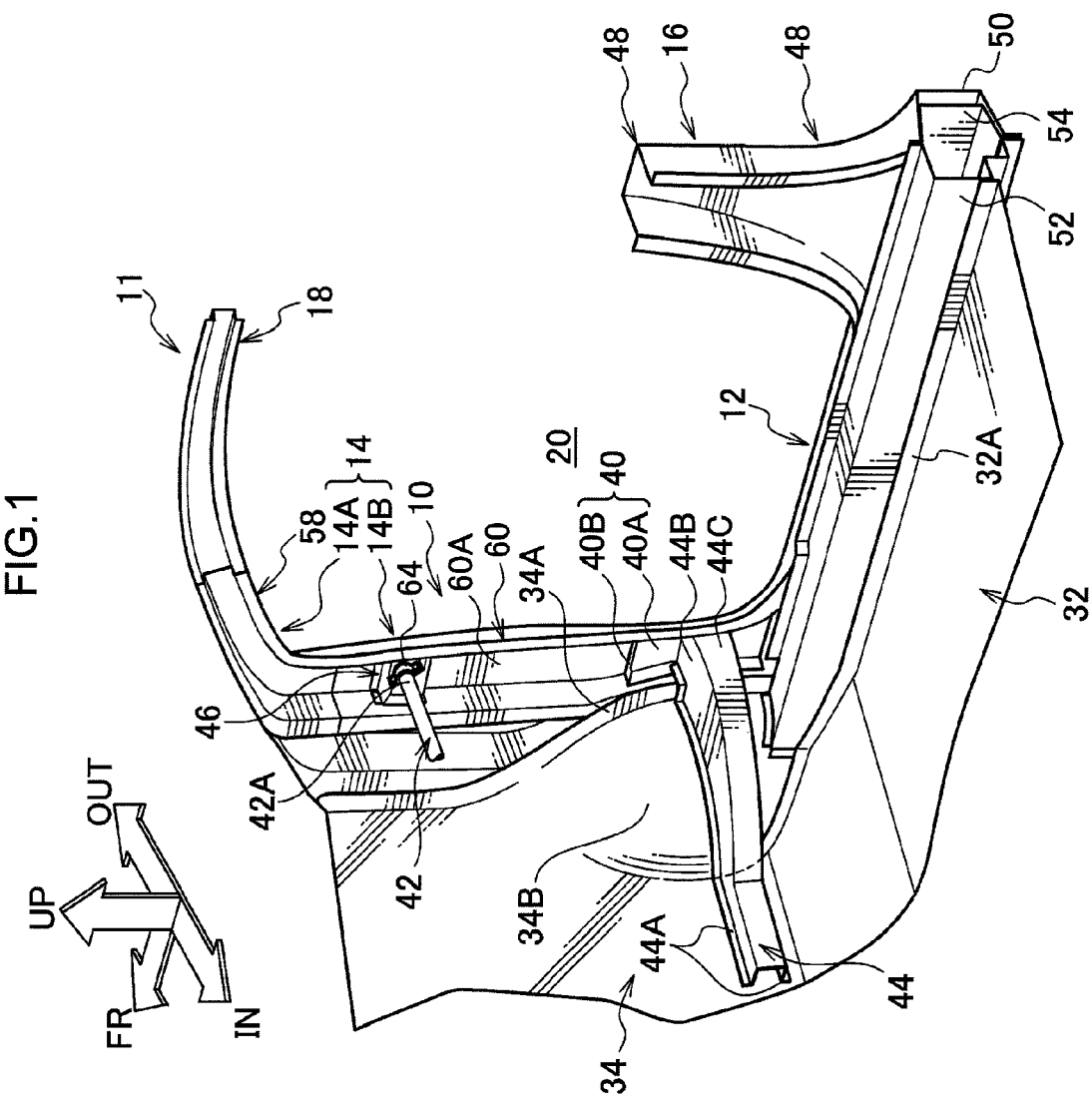
FIG. 1 is a perspective view showing the general configuration of a vehicle body forward portion structure according to a first embodiment of the present invention.

Vehicle body forward portion structure 10 according to a first embodiment of the present invention is explained based on FIGS. 1-7. Firstly, vehicle body configuration for application of vehicle body forward portion structure 10 to automobile 11 is briefly explained, after which the main portion of vehicle body forward portion structure 10 is explained. In addition, while vehicle body forward portion structure 10 is applied across the entire part of automobile 11 in a vehicle width direction, essentially only one side of vehicle body forward portion structure 10 is explained because it is formed symmetrically around a center line that passes through the center of the vehicle in a vehicle width (left-right) direction. Further, arrow FR indicates a forward direction in a vehicle front-rear direction, arrow UP indicates an upper direction in a vehicle vertical direction, and arrow IN and arrow OUT indicate a vehicle width direction inner side and a vehicle width direction outer side in the drawings respectively.

General Configuration of Automobile

Figure 2:
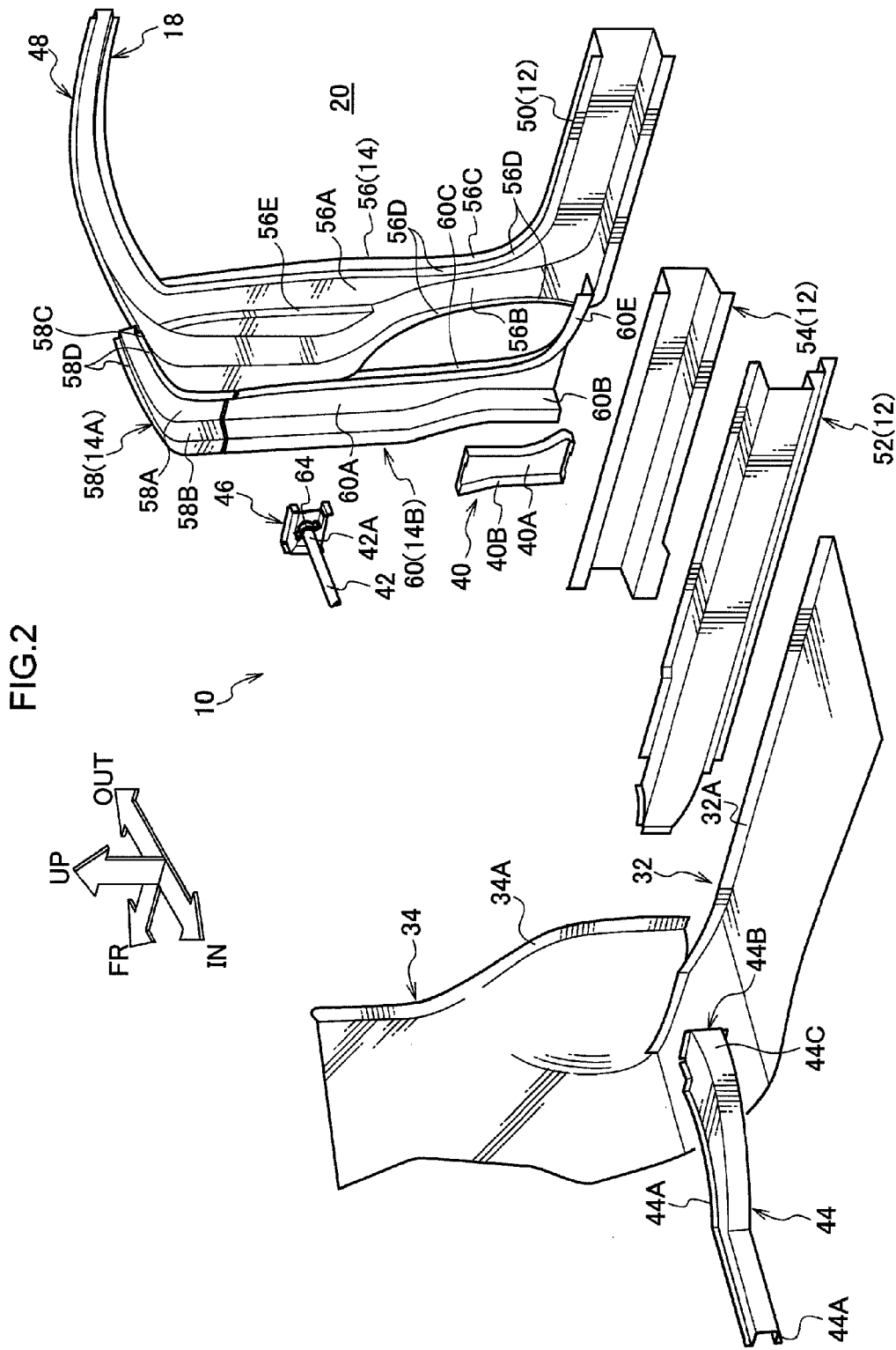
FIG. 2 is an exploded perspective view of the portion shown in FIG. 1 in the vehicle body forward portion structure according to a first embodiment of the present invention.

In FIG. 1, a perspective view of a part of the front side of automobile 11 to which vehicle body forward portion structure 10 has been applied is shown as seen from the vehicle interior and, in FIG. 2, an exploded perspective view is shown of the portion shown in FIG. 1. Further, in FIG. 3, a part of the front side of automobile 11 is shown in lateral view as seen from the vehicle interior. As shown in these drawings, rocker 12, which is a frame member that extends in a vehicle front-rear direction, is provided at the lower edge side of the vehicle at an outer side in a vehicle width direction of automobile 11.

Front pillar 14 and center pillar 16, which are frame members that respectively extend in a vehicle vertical direction from the vehicle front end portion and central portion of rocker 12, are provided in an upright state. Further, automobile 11 is provided with roof side rail 18, which is a frame member that extends in a vehicle front-rear direction and connects the upper ends of front pillar 14 and center pillar 16. While not shown in the drawings, rocker 12 and roof side rail 18 extend as far as a rear pillar.

Figure 7:
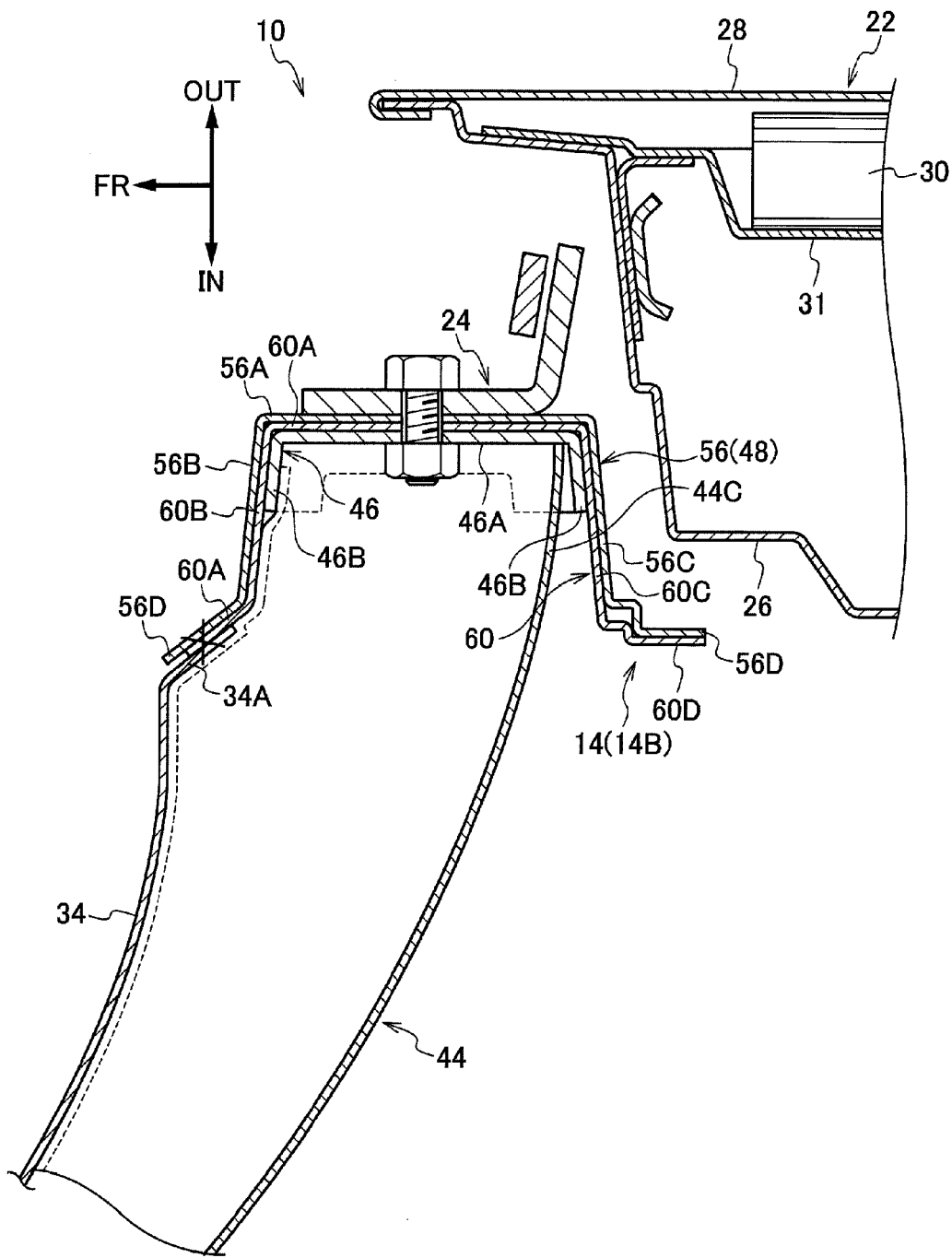
FIG. 7 is a plan sectional view showing a joining configuration to a pillar reinforcement lower of a dash cross member that is a component of the vehicle body forward portion structure according to a first embodiment of the present invention.

Further, door opening portion 20 is formed at the side portion of automobile 11, being circumscribed by the vehicle front portion of rocker 12, front pillar 14, center pillar 16 and the vehicle front portion of roof side rail 18. Door opening portion 20 is formed so as to be opened and closed by side door 22 shown in FIGS. 4A and 7. As shown in FIG. 7, front edge portion 22A of side door 22 is rotatably supported at front pillar 14 by door hinge 24, and door opening portion 20 is opened and closed by said rotation.

To explain further about side door 22, side door 22 has door inner panel 26 that opens outward in a vehicle width direction, and door outer panel 28 that is fixed to the peripheral edge portion of door inner panel 26 by hemming processing or the like and that covers the end of the door inner panel 26 opening. Impact beam 30, which is a door reinforcement member, is disposed in close proximity to door outer panel 28 inside the closed space formed by door inner panel 26 and door outer panel 28. Impact beam 30 is fixed to door inner panel 26 via extension (bracket) 31.

Further, in automobile 11, as shown in FIGS. 1 and 2, flange 32A, which is formed at an outer edge in a vehicle width direction of floor panel 32, is joined to the inner surface of rocker 12 in a vehicle width direction, and flange 34A, which is formed at an outer edge in a vehicle width direction of dash panel 34 as described below, is joined to the inner surface of front pillar 14 in a vehicle width direction. Bulge portion 34B, which bulges towards the vehicle interior so as to form wheel house 36 (refer to FIG. 3), is formed at the vehicle width direction outer edge portion and the vehicle vertical direction lower portion of dash panel 34.

As shown in FIG. 3, front wheel 38 is disposed inside wheel house 36. Hinge reinforcement 40, which reinforces the fixed portion of door hinge 24, is provided at a portion of front pillar 14 directly to the rear of front wheel 38. Hinge reinforcement 40 is explained in detail below.

Further, in automobile 11, front pillars 14 at either side in a vehicle width direction (left and right) are joined by instrument panel reinforcement 42 and dash cross member 44, which are both cross members. Instrument panel reinforcement 42 can be understood as a reinforcement member that reinforces an instrument panel not shown in the drawings and, in this embodiment, forms a pipe shape. Vehicle width direction outer end portion 42A of instrument panel reinforcement 42 is connected to the middle portion in a vehicle vertical direction of front pillar 14; that is, to be more specific, to a portion having a position in the vehicle vertical direction that is substantially aligned with the beltline (omitted from the drawings) of side door 22. In this embodiment, vehicle width direction outer end portion 42A of instrument panel reinforcement 42 is connected via bracket 46, which is described below.

Dash cross member 44 is formed in the shape of a hat opened toward the vehicle front and upper and lower flanges 44A thereof are joined from the rear surface side of dash panel 34, as a result of which dash cross member 44 forms a closed cross section frame structure with dash panel 34. In addition to being joined to bulge portion 34B (wheel house 36) of dash panel 34, dash cross member 44 has vehicle width direction outer end portion 44B connected to a portion of front pillar 14 at a position substantially aligned in a vehicle vertical direction with the position at which hinge reinforcement 40 is disposed.

Further, as shown in FIG. 2, rocker 12, front pillar 14 and roof side rail 18 are formed integrally as side member outer panel 48, which is a large pressed part. While not shown in FIG. 2, center pillar 16 and a not-shown rear pillar outer panel and rear fender are formed integrally with side member outer panel 48. The respective components of side member outer panel 48 such as rocker 12, front pillar 14 and roof side rail 18 are formed with a hat-shaped cross section that is open toward the inside in a vehicle width direction as seen in sectional view intersecting the longitudinal direction of the respective components.

As shown in FIGS. 1 and 2, rocker inner panel 52, which has a hat-shaped cross section that is open toward the outside in a vehicle width direction, is joined to rocker outer portion 50, which is a component of rocker 12 in side member outer panel 48, such that rocker 12 forms a closed cross section frame structure. Further, rocker 12 in this embodiment is provided with rocker reinforcement 54, which has a similar shape to rocker outer portion 50, inside the above described closed cross section. Accordingly, rocker 12 in this embodiment is configured by three parts.

Configuration of Front Pillar

In vehicle body forward portion structure 10, the respective components in a vehicle vertical direction of front pillar 14 are each configured by two parts. Specifically as shown in FIGS. 1 and 2, pillar reinforcement upper 58 is joined to front pillar outer portion 56, which is a component of front pillar 14 in side member outer panel 48, thereby configuring front pillar upper 14A, which is the upper portion of front pillar 14. Further, front pillar lower 14B, which is the lower portion of front pillar 14, is configured by joining pillar reinforcement lower 60 to front pillar outer portion 56.

To explain further about front pillar outer portion 56, front pillar outer portion 56 is configured by front wall 56B and rear wall 56C that are provided so as to extend inward in a vehicle width direction from vehicle front and rear edges of bottom wall 56A, together with flanges 56D that extend pendently from the inner edges in a vehicle width direction of front wall 56B and rear wall 56C. Further, in the present embodiment, at the portion configuring the upper part of front pillar lower 14B in front pillar outer portion 56, front wall 56B bulges in a vehicle front direction and step-shaped standing wall 56E is formed between front wall 56B and rear wall 56C.

Further, pillar reinforcement upper 58 and pillar reinforcement lower 60 have a hat-shaped cross section that is open toward the inside in a vehicle width direction as seen in sectional view intersecting the respective longitudinal directions thereof. More specifically, pillar reinforcement upper 58 is configured by front wall 58B and rear wall 58C that are provided so as to extend inward in a vehicle width direction from vehicle front and rear edges of bottom wall 58A, together with flanges 58D that extend pendently from the inner edges in a vehicle width direction of front wall 58B and rear wall 58C. This pillar reinforcement upper 58 is joined to flanges 56D of front pillar outer portion 56 at flanges 58D by spot welding.

Pillar reinforcement lower 60 is configured by front wall 60B and rear wall 60C that are provided so as to extend inward in a vehicle width direction from vehicle front and rear edges of bottom wall 60A, together with flanges 60D that extend pendently from the inner edges in a vehicle width direction of front wall 60B and rear wall 60C. Pillar reinforcement lower 60 is joined to flanges 56D of front pillar outer portion 56 at flanges 60D by spot welding.

In this embodiment, as shown in FIGS. 1 and 2, since, as described above, the upper part of front wall 56B bulges in a vehicle front direction in the upper part of front pillar lower 14B, flanges 56D are offset in a vehicle front direction with respect to flanges 60D of pillar reinforcement lower 60. At this area, the joining position of the above-described bracket 46 are, as described below, joined to step-shaped standing wall 56E of front pillar outer portion 56 formed at front wall 60B.

In addition, rocker joint portion 60E, which extends to the inside of rocker 12, is provided at pillar reinforcement lower 60 in this embodiment, being sandwiched between and joined to rocker outer portion 50 and rocker reinforcement 54.

Figure 4A:
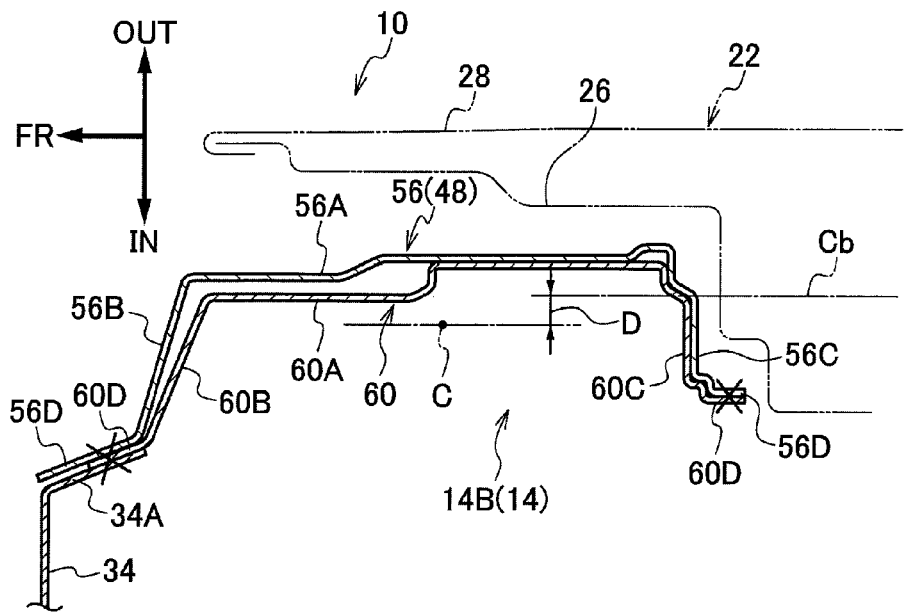
FIG. 4A is a closed cross section of a front pillar lower that is a component of the vehicle body forward portion structure according to a first embodiment of the present invention.

As a result, as shown in FIG. 4A, the respective parts in a vehicle vertical direction of the front pillar 14 are formed as open cross section shapes that are open toward the inside in a vehicle width direction as seen in plan sectional view. In addition, the X-shaped symbol shown in the respective drawings including FIG. 4A illustrates part for spot welding. Further, as shown in FIG. 4A, in vehicle body forward portion structure 10, flange 34A formed at an outer edge in a vehicle width direction of dash panel 34 is joined by spot welding to vehicle front side flange 60D of pillar reinforcement lower 60. As shown in FIG. 1, flange 34A is joined to flange 60D at a lower portion in a vehicle vertical direction of front pillar lower 14B.

Further, both pillar reinforcement upper 58 and pillar reinforcement lower 60, which are components of front pillar 14, which has an open cross section structure, are configured by high-tensile steel plate. Here, the high-tensile steel plate in this embodiment refers, for example, to steel plate for automobiles having tensile strength (official standard, same below) of 350 MPa or more, and steel plate having tensile strength of 590 MPa or more may be referred to as ultra high-tensile steel plate.

In this embodiment, pillar reinforcement upper 58 and pillar reinforcement lower 60 are configured by high-tensile steel plate having tensile strength of 980 MPa and a thickness of 1.4 mm. Further, front pillar outer portion 56 (side member outer panel 48), which is a component of front pillar 14 together with pillar reinforcement upper 58 and pillar reinforcement lower 60, is configured by steel plate for automobiles having tensile strength of 270 MPa and a thickness of 0.7 mm. In other words, pillar reinforcement lower 60 in this embodiment is configured by thick high-tensile steel plate.

As a result of a configuration consisting of the thick high-tensile steel plate of pillar reinforcement upper 58 and pillar reinforcement lower 60, front pillar 14 is configured such that a predetermined degree of strength is secured as described below while having the open cross section structure described above. In this embodiment, pillar reinforcement lower 60, which is a component of front pillar lower 14B, which is the lower part of front pillar 14, corresponds at least to the high strength portion of the present invention.

Connection Configuration of Instrument Panel Reinforcement

As shown in FIGS. 1 to 3, the above-described bracket 46 is disposed inside the open cross section portion of front pillar lower 14B, and is interposed between front wall 60B and rear wall 60C of pillar reinforcement lower 60 so as to be load transferable. That is, bracket 46 in this embodiment has a configuration that functions as a front-rear load transfer member that can transfer load from the front wall 60B side to the rear wall 60C side. Further, bracket 46 has a function of joining the outer end in a vehicle width direction of instrument panel reinforcement 42 to pillar reinforcement lower 60. This is described in detail below.

Figure 5A:
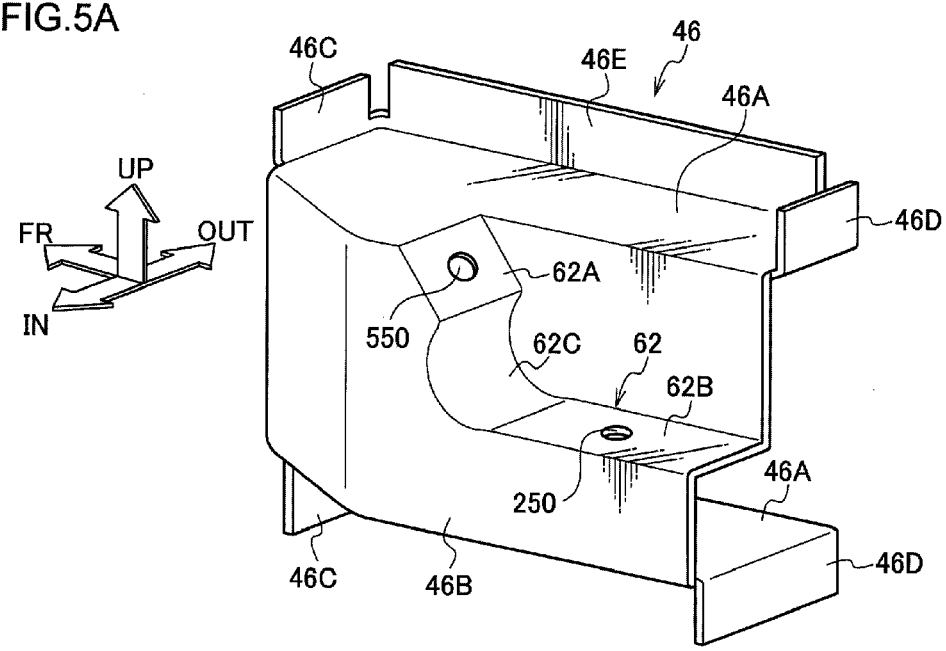
FIG. 5A is a perspective view of a single bracket piece that is a component of the vehicle body forward portion structure according to a first embodiment of the present invention.
Figure 5B:
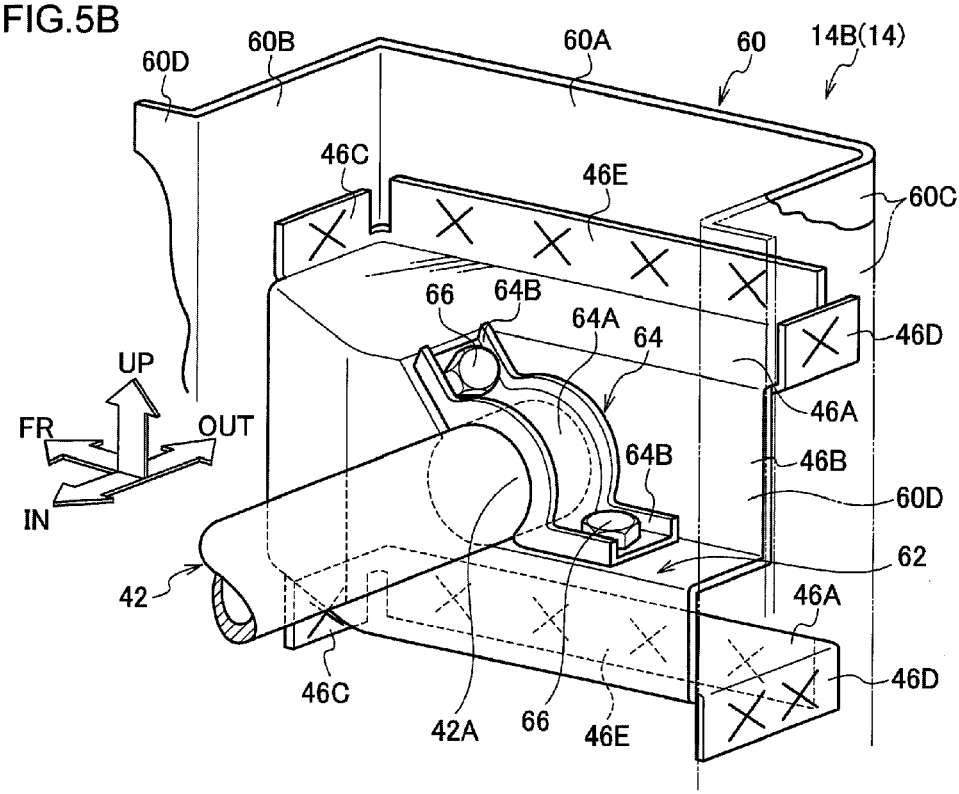
FIG. 5B is a perspective view showing a joined state to a pillar reinforcement lower of a bracket that is a component of the vehicle body forward portion structure according to a first embodiment of the present invention.

As shown in FIGS. 5A and 5B, bracket 46 is open toward the outer side in a vehicle width direction and toward vehicle front and rear directions as a result of having a pair of upper and lower horizontal walls 46A connected at the inner edges in a vehicle width direction thereof by side wall 46B. Forward-facing flanges 46C respectively project outward in a vertical direction from front edges of upper and lower horizontal walls 46A, and rear-facing flanges 46D respectively project outward in a vertical direction from rear edges of upper and lower horizontal walls 46A. Further, in this embodiment, outward-facing flanges 46E respectively project from the outer edges in a vehicle width direction of upper and lower horizontal walls 46A.

As shown in FIG. 5B, bracket 46 is fixed to pillar reinforcement lower 60 by joining forward-facing flanges 46C to front wall 60B, rear-facing flanges 46D to rear wall 60C and outward-facing flanges 46E to bottom wall 60A by spot welding. Although not shown in the drawings, front wall 58B and rear wall 58C of pillar reinforcement upper 58 are also spot welded to the joint portions of forward-facing flanges 46C to front wall 60B and the joint portions of rear-facing flanges 46D to rear wall 60C (triple sheet overlay).

As a result, front pillar lower 14B has a configuration in which the sectional shape can be easily maintained with respect to load from the vehicle front at a position in the vehicle vertical direction that substantially aligns with the belt line of side door 22. Further, step-shaped attachment base 62 is formed at side wall 46B of bracket 46 by press (stamp) processing or the like. In this embodiment, upright wall 62A, which substantially faces the vehicle rear, and horizontal wall 62B, which faces upward of the vehicle, of attachment base 62 form a substantial L shape in lateral view. Further, circular wall portion 62C, which corresponds to the outer surface shape of instrument panel reinforcement 42, is formed at the corner portion between upright wall 62A and horizontal wall 62B.

As shown in FIG. 5B, instrument panel reinforcement 42 is fastened to attachment base 62 of bracket 46 by pressing member 64 in a state in which vehicle width direction outer end portion 42A is set in circular wall portion 62C. Specifically, pressing member 64 has circular wall portion 64A, which corresponds to the outer surface shape of instrument panel reinforcement 42, and a pair of flanges 64B, which extend from either end of circular wall portion 64A. Front side flange 64B is fastened to upright wall 62A by threadably attaching a bolt 66 to a nut that is not shown, and the rear side flange of the pair of flanges 64B is fastened to horizontal wall 62B using a bolt 66, whereby vehicle width direction outer end portion 42A of instrument panel reinforcement 42 is held between circular wall portion 62C and circular wall portion 64A.

Connection Configuration Of Dash Cross Member

As shown in FIGS. 6 and 7, vehicle width direction outer end portion 44B of dash cross member 44 is inserted into the open cross section portion of front pillar lower 14B and is joined to pillar reinforcement lower 60, which is a component of front pillar lower 14B. In this embodiment, the outer end portion 44B is joined at a region of pillar reinforcement lower 60 at which hinge reinforcement 40 is attached.

To explain further about hinge reinforcement 40, as shown in FIG. 6, hinge reinforcement 40 includes flat plate portion 40A, which is fastened securely to bottom wall 60A together with door hinge 24, and peripheral wall 40B, which juts out a short distance in the vehicle width direction from the peripheral edges of flat plate portion 40A. Peripheral wall 40B is configured such that it juts out from flat plate portion 40A shorter than lengths that front wall 60B and rear wall 60C of pillar reinforcement lower 60 jut out from bottom wall 60A. The front and rear portions of peripheral wall 40B of hinge reinforcement 40 are joined to front wall 60B and rear wall 60C of pillar reinforcement lower 60 and to front wall 56B and rear wall 56C of front pillar outer portion 56 by spot welding in a state of triple sheet overlay.

Further, upper and lower flanges 44A of dash cross member 44 extend into the open cross section portion of front pillar lower 14B. Upper and lower flanges 44A are joined to front wall 60B of pillar reinforcement lower 60 and to peripheral wall 40B of hinge reinforcement 40 by spot welding.

As shown in FIG. 7, the portion of rear wall 44C of dash cross member 44 which is inserted into the open cross section portion of front pillar lower 14B, is positioned in close proximity to rear wall 60C of pillar reinforcement lower 60. That is, vehicle width direction outer end portion 44B of dash cross member 44 fills the open cross section portion of front pillar lower 14B, which forms an open cross section structure, and is configured to function as a bulkhead of front pillar lower 14B. As a result, front pillar lower 14B has a configuration that easily maintains the cross sectional shape with respect to load from the front of the vehicle at a position in a vertical direction that is overlapped with a location of front wheel 38 inside wheel house 36 (refer to FIG. 3).

Next, the mechanism of the first exemplary embodiment is explained.

In vehicle body forward portion structure 10 having the above-described configuration, because front pillar 14 is configured to include pillar reinforcement upper 58 and pillar reinforcement lower 60, which are formed from high-tensile steel plate, both the number of parts of front pillar 14 and the weight thereof are reduced.

Figure 4B:
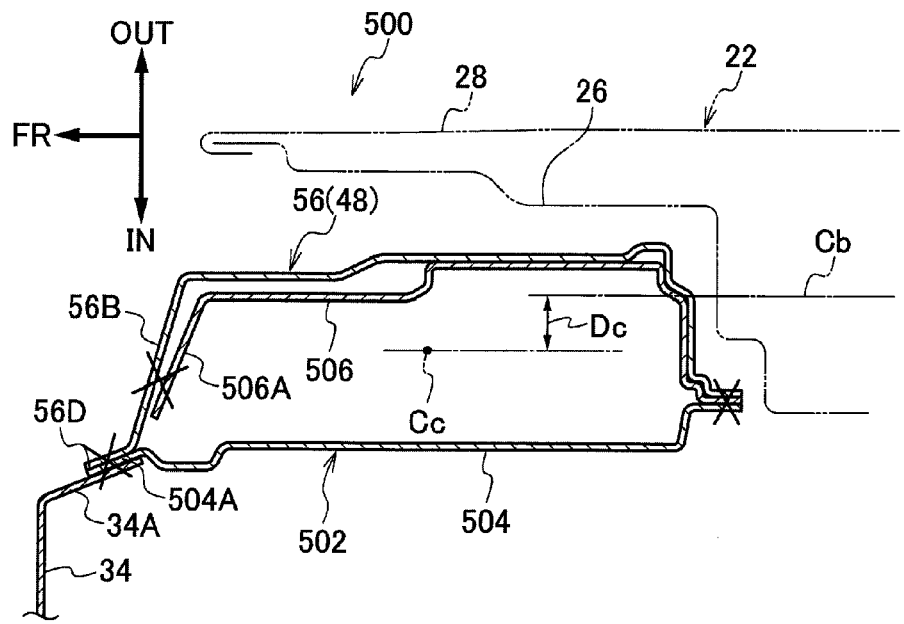
FIG. 4B is a closed cross section of a front pillar lower that is a component of a vehicle body forward portion structure according to a comparative example.
Figure 15:
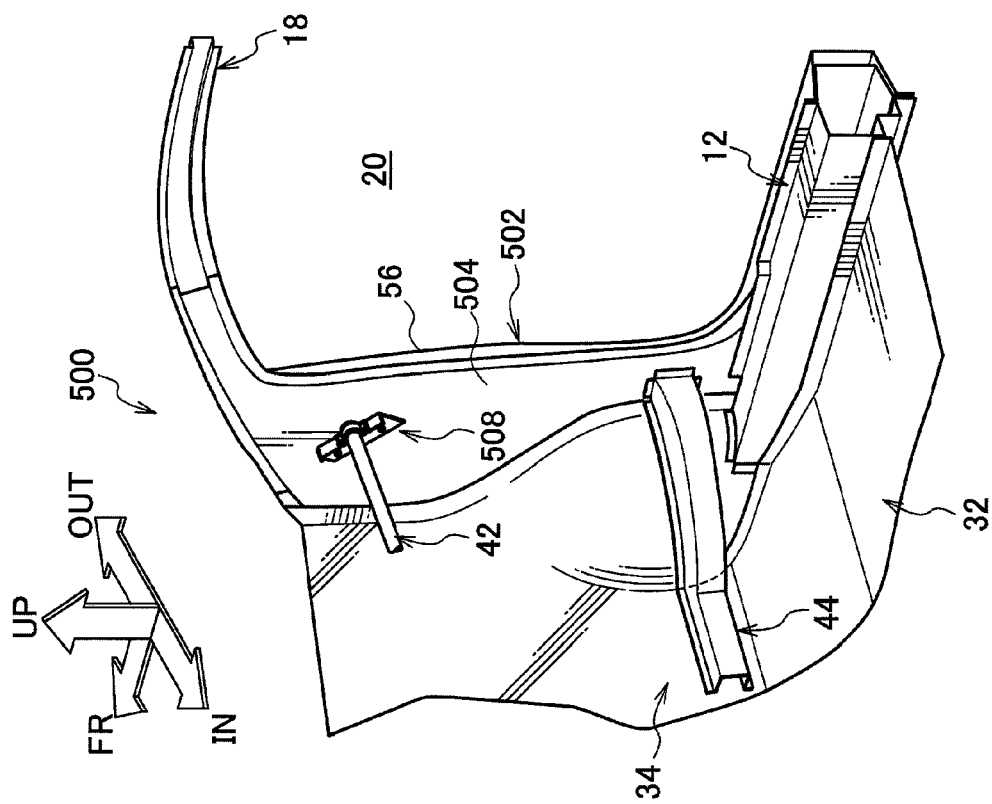
FIG. 15 is a perspective view of a vehicle body forward portion structure according to a comparative example.
Figure 16:
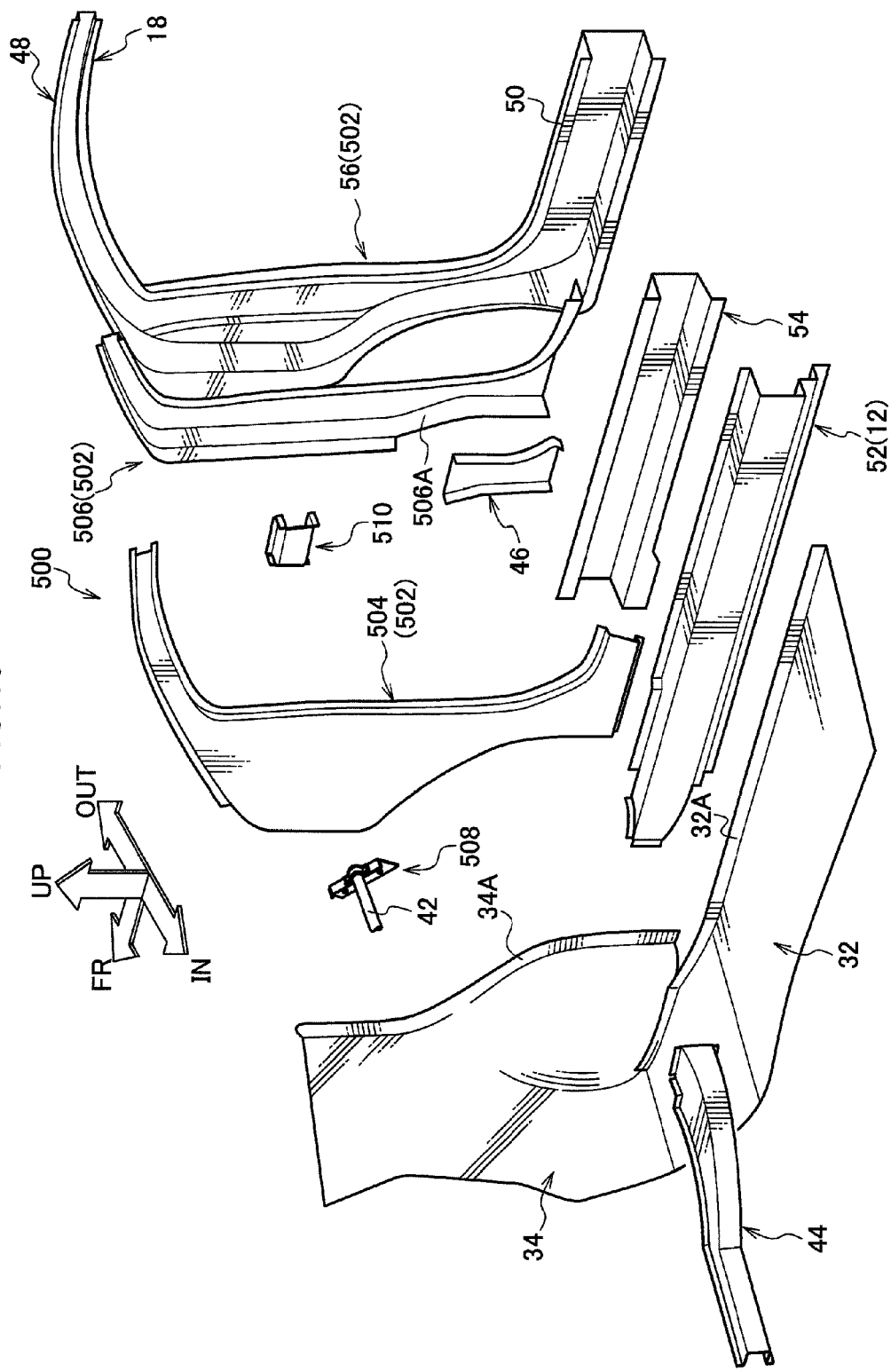
FIG. 16 is an exploded perspective view of the vehicle body forward portion structure according to the comparative example shown in FIG. 15.

This point is explained by comparison with vehicle body forward portion structure 500 according to the comparative examples shown in FIGS. 4B, 15 and 16. In vehicle body forward portion structure 500, front pillar 502 has a three-part configuration in which pillar outer reinforcement 506 is provided inside the closed cross section formed by front pillar outer portion 56 and front pillar inner panel 504, as shown in FIG. 4B. With this configuration in which front pillar outer portion 56 which has same weight and is made by same material is used same as the present embodiment, in order to secure the same strength (load-bearing capacity) as front pillar 14 in the present embodiment, it is necessary, for example, front pillar inner panel 504 to be configured by automobile steel plating having a tensile strength of 440 MPa and a thickness of 1.0 mm and for pillar outer reinforcement 506 to be configured by automobile steel plating having a tensile strength of 440 MPa and a thickness of 1.4 mm. Front pillar 14 of the present embodiment can be confirmed to have achieved a weight reduction of substantially 25% with respect to the cross section shown in FIG. 4A, as compared to front pillar 502 of vehicle body forward portion structure 500.

Further, in vehicle body forward portion structure 10, because front pillar 14 forms an open cross section structure that is open inward in a vehicle width direction, centroid C of front pillar 14 is positioned further outward in a vehicle width direction than centroid Cc of front pillar 502, which has a closed cross section. FIG. 4A shows the position of centroid C in front pillar lower 14B including a part of the belt line portion of side door 22 in the vehicle front direction, and FIG. 4B shows centroid Cc in front pillar 502 including a part of the belt line portion of side door 22 in the vehicle front direction. Here, centroids C and Cc of front pillars 14 and 502 can be viewed as the center of gravity when the cross sections shown in FIGS. 4A and 4B are treated as plan views in which the plate thickness (specific gravity) of the respective parts is assumed to be constant. Accordingly, at a position in a vehicle vertical direction that corresponds to the belt line of side door 22 in front pillar lower 14B, the position of centroid C is in closer proximity to centroid Cb in the belt line portion of side door 22 than centroid Cc according to the comparative example. To put this another way, offset amount D of centroid C relative to centroid Cb in a vehicle width direction is smaller than offset amount Dc of centroid Cc relative to centroid Cb in a vehicle width direction according to the comparative example (D<Dc).

As a result, in vehicle body forward portion structure 10, when load is transmitted from front pillar lower 14B to side door 22 in the vehicle rear direction as a result of a frontal collision of automobile 11, the bending moment acting on side door 22 as a result of the load can be reduced as compared to in vehicle body forward portion structure 500. Accordingly, detachment of side door 22 from the vehicle body when automobile 11 is involved in a frontal collision can be effectively prevented or suppressed, and load can be efficiently transmitted from front pillar lower 14B to side door 22. Due to this effect, it is possible to simplify the configuration for preventing detachment of side door 22 of vehicle body forward portion structure 10, which also contributes to reduction of weight.

In particular, because bracket 46 is provided at a vehicle vertical position in front pillar lower 14B that corresponds to the belt line, the cross section of front pillar lower 14B, which has an open cross section, is maintained when automobile 11 is involved in a frontal collision. As a result, in vehicle body forward portion structure 10, load can be transmitted all the more efficiently from front pillar lower 14B to side door 22 in the event of a frontal collision.

In addition, flange 34A of dash panel 34 is directly joined to flange 60D of pillar reinforcement lower 60. As a result, load that is input to dash panel 34 when, for example, automobile 11 is involved in a frontal collision is efficiently transmitted to pillar reinforcement lower 60, which is the high-strength portion of front pillar lower 14B.

In vehicle body forward portion structure 500 according to the comparative example, for example, front wall 506A of pillar outer reinforcement 506 is joined to front wall 56B, and flange 34A of dash panel 34 is joined to flange 56D of front pillar outer portion 56 and to flange 504A of front pillar inner panel 504. As a result, load input to dash panel 34 is transmitted to the high-strength pillar outer reinforcement 506 via front pillar inner panel 504, which has comparatively low strength, and the efficiency of load transmission is poor. Further, in vehicle body forward portion structure 500, the outer end in a vehicle width direction of dash cross member 44 is joined to a surface of front pillar inner panel 504 that faces inward in a vehicle width direction.

In contrast, in vehicle body forward portion structure 10, because dash panel 34 is directly joined to pillar reinforcement lower 60 as described above, load from dash panel 34 is efficiently transmitted to front pillar lower 14B. Moreover, vehicle width direction outer end portion 44B of dash cross member 44, which reinforces dash panel 34, is directly joined to pillar reinforcement lower 60. As a result, when automobile 11 is involved in a frontal collision, load is transmitted all the more efficiently from dash panel 34—that is, from dash cross member 44—to front pillar lower 14B.

Further, in vehicle body forward portion structure 10, the pillar reinforcement lowers 60 that are a part of front pillar lowers 14B at both sides in a vehicle width direction are joined (spanned) by instrument panel reinforcement 42 and dash cross member 44. As a result, in vehicle body forward portion structure 10, in the configuration employing a front pillar lower 14B having an open cross section configuration, the torsional rigidity of front pillar lower 14B is secured. In addition, while either of instrument panel reinforcement 42 or dash cross member 44 would contribute to ensuring the torsional rigidity of front pillar lower 14B on its own, sufficient torsional rigidity is secured by having both instrument panel reinforcement 42 and dash cross member 44 bridge between pillar reinforcement lowers 60 at both sides in a vehicle width direction.

Furthermore, since instrument panel reinforcement 42 and dash cross member 44 bridge between both pillar reinforcement lowers 60, load can be efficiently transmitted from one front pillar lower 14B to the other front pillar lower 14B. In vehicle body forward portion structure 500 according to the comparative example, for example, instrument panel reinforcement 42 is connected to front pillar 502 via bracket 508, which is fastened to front pillar inner panel 504. Further, the end portion in a vehicle width direction of dash cross member 44 abuts and is joined to front pillar inner panel 504. Accordingly, in vehicle body forward portion structure 500, when automobile 11 is involved in an offset frontal collision, load is transmitted from front pillar 502 at the side of the collision to front pillar 502 at the opposite side to the collision via the relatively low-strength front pillar inner panel 504, instrument panel reinforcement 42, dash cross member 44 and front pillar inner panel 504 at the opposite side to the collision. As a result, each front pillar 502 needs reinforcement in order to withstand the putative load in the case that it is at the collision side.

In contrast, in vehicle body forward portion structure 10, instrument panel reinforcement 42 and dash cross member 44 bridge between both pillar reinforcement lowers 60, which are the high-strength portions of front pillar lowers 14B. Accordingly, in the event of an offset frontal collision, load can be efficiently transmitted from front pillar lower 14B at the collision side to front pillar lower 14B at the opposite side to the collision without passing through a low-strength portion. As a result, in vehicle body forward portion structure 10, the resistance at the collision side with respect to an offset collision is reduced, in other words, the required strength is decreased, which also contributes to reduction of weight.

In addition, vehicle width direction outer end portion 44B of dash cross member 44 functions as a protection wall inserted into the open cross section portion of front pillar lower 14B. As a result, if, for example, front wheel 38 at the collision side contacts the lower part of front pillar lower 14B in the event of an offset frontal collision, the sectional shape of front pillar lower 14B around the contact portion is maintained. While maintaining the sectional shape of front pillar lower 14B in this way, the load from front wheel 38 can be efficiently transmitted to rocker 12 and the like.

Furthermore, in vehicle body forward portion structure 10, instrument panel reinforcement 42 is connected to pillar reinforcement lower 60 via bracket 46. As a result, the number of parts is reduced as compared to vehicle body forward portion structure 500 which has bracket 508 and separately has gusset 510, which is for transmitting load to the beltline portion of side door 22, inside the closed cross section of front pillar 502.

Moreover, in vehicle body forward portion structure 500 according to the comparative example, since front pillar 502 has a closed sectional structure, bracket 508 is fixed relative to front pillar inner panel 504 by fastening and instrument panel reinforcement 42 is fixed to bracket 508 by fastening. In contrast, in vehicle body forward portion structure 10, bracket 46 is joined to pillar reinforcement lower 60 by spot welding. As a result, in vehicle body forward portion structure 10, the binding rigidity of instrument panel reinforcement 42 is improved relative to vehicle body forward portion structure 500. In particular, the binding rigidity of instrument panel reinforcement 42 is also improved because the joining location of bracket 46 is pillar reinforcement lower 60, which forms the high-strength portion of front pillar lower 14B.

In addition, in the first exemplary embodiment, pillar reinforcement upper 58 and pillar reinforcement lower 60 are separate members; however, the present invention is not limited to this and, for example, pillar reinforcement upper 58 and pillar reinforcement lower 60 may have an integrated structure. Further, in the present invention, it is sufficient if, among pillar reinforcement upper 58 and pillar reinforcement lower 60, at least pillar reinforcement lower 60 is provided and, front pillar upper 14A may have a three-member configuration.

Further, in the first exemplary embodiment, a part of dash cross member 44 is joined to pillar reinforcement lower 60 via hinge reinforcement 40; however, the present invention is not limited to this and, for example, a configuration may be adopted in which dash cross member 44 is joined to pillar reinforcement lower 60 only via hinge reinforcement 40, or in which dash cross member 44 is joined directly to pillar reinforcement lower 60.

Next, another embodiment of the present invention is explained. In addition, parts or portions that are essentially the same as in the configuration of the above-described first embodiment or prior embodiments are provided with the same reference numerals as in the configuration of the above-described first embodiment or prior embodiments and explanation thereof is omitted.

Second Exemplary Embodiment

Figure 8:
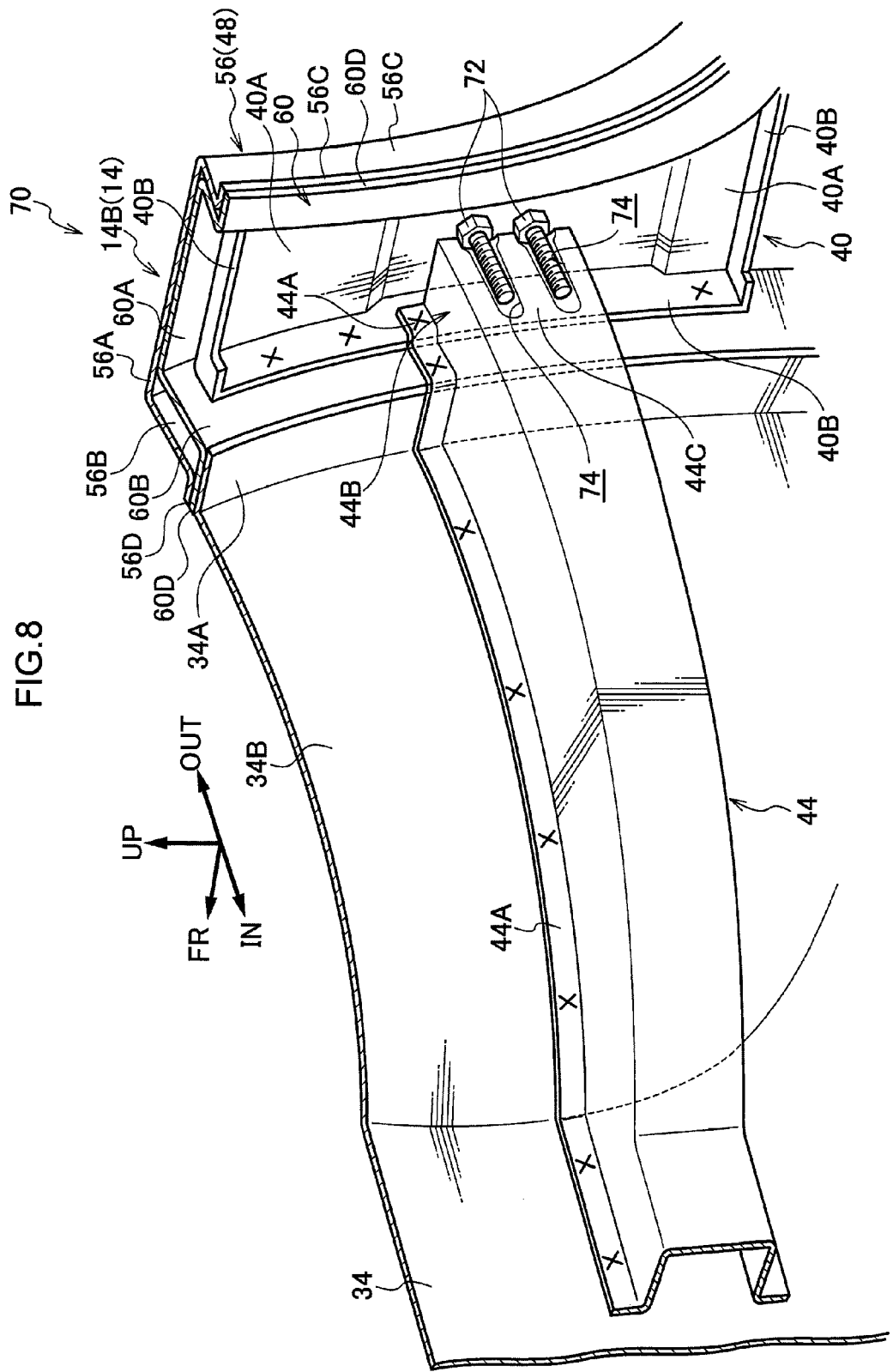
FIG. 8 is a perspective view showing a joining configuration to a pillar reinforcement lower of a dash cross member that is a component of the vehicle body forward portion structure according to a second embodiment of the present invention.
Figure 9:
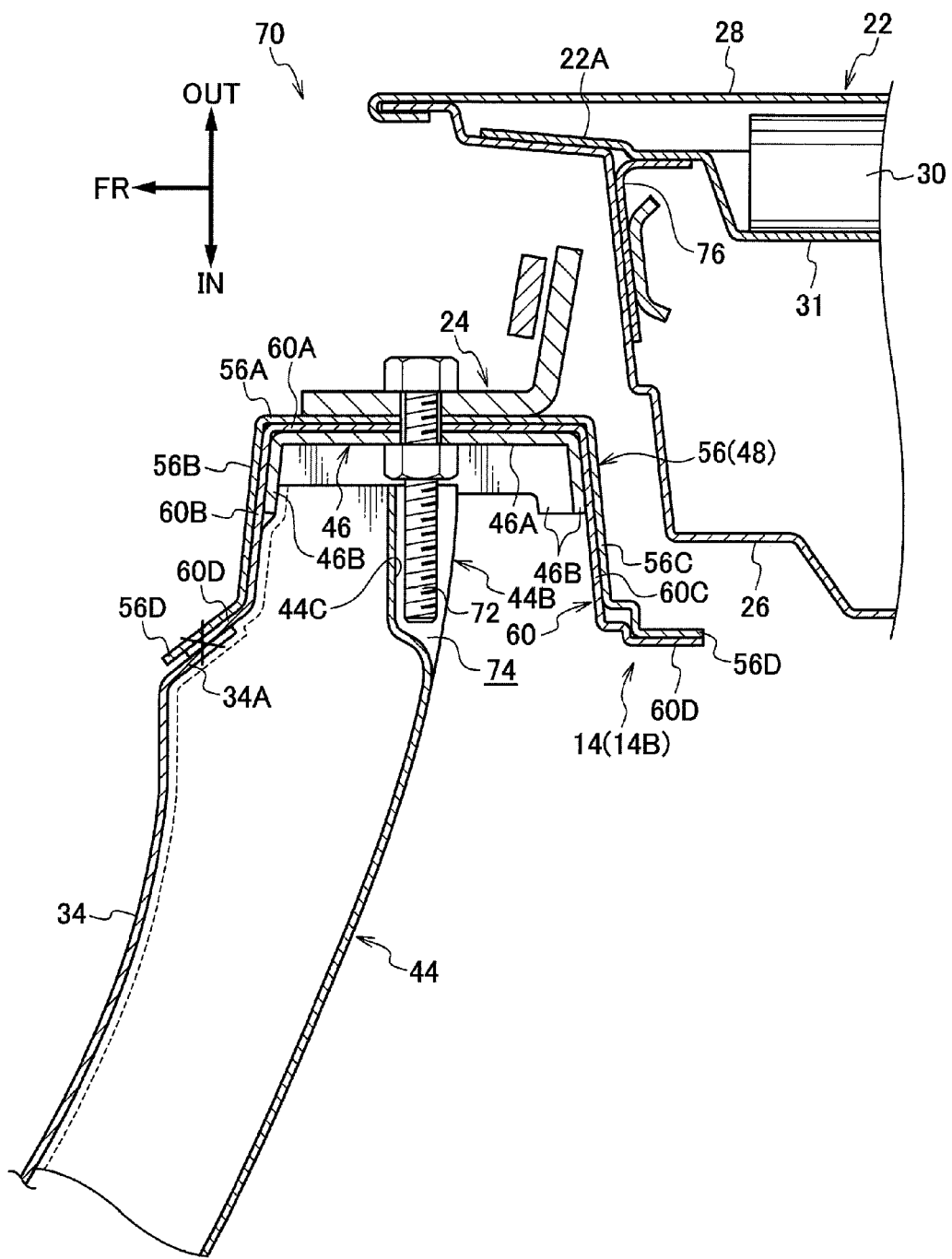
FIG. 9 is a plan sectional view showing a joining configuration to a pillar reinforcement lower of a dash cross member that is a component of the vehicle body forward portion structure according to a second embodiment of the present invention.

In FIG. 8, the main portion of vehicle body forward portion structure 70 according to the second exemplary embodiment is shown in perspective view corresponding to FIG. 6 of the first exemplary embodiment and, in FIG. 9, the main portion of vehicle body forward portion structure 70 is shown in cross section view corresponding to FIG. 7. As shown in these drawings, in vehicle body forward portion structure 70, rear wall 44C of dash cross member 44 is disposed in close proximity with bolts 72, which serve as fastening members. The configuration in this regard differs from vehicle body forward portion structure 10 in which rear wall 44C of dash cross member 44 is disposed in close proximity with rear wall 60C of pillar reinforcement lower 60.

Specifically, in vehicle body forward portion structure 70, door hinge 24 is fixed to the lower portion of front pillar lower 14B by fastening with bolts 72, which protrude into the inside of the open cross section portion of front pillar lower 14B. As shown in FIG. 9, bolts 72 extend as far as the vicinity of the surface of pillar reinforcement lower 60 that opens toward the inner side in a vehicle width direction, at a substantially middle portion in a vehicle front-rear direction within the open cross section portion of front pillar lower 14B. Further, as shown in FIG. 8, plural bolts 72 (two in this embodiment) are provided in a row in a vehicle vertical direction.

Bolt recess portions 74 in which respective bolts 72 are inserted are formed at rear wall 44C of dash cross member 44. Further, load transmission member 76 is provided at front edge portion 22A of side door 22 of automobile 11 that has been fitted with vehicle body forward portion structure 70. The inner edge in a vehicle width direction of load transmission member 76 overlaps relative to door hinge 24 in a vehicle width direction and a vehicle vertical direction, and the outer edge thereof in a vehicle width direction overlaps relative to impact beam 30 in a vehicle width direction and a vehicle vertical direction.

As a result of the foregoing, in vehicle body forward portion structure 70, a load transmission path is formed that transmits load from dash panel 34 and dash cross member 44 to impact beam 30 via vehicle width direction outer end portion 44B of dash cross member 44, bolts 72, door hinge 24 and load transmission member 76. Other portions of the configuration of vehicle body forward portion structure 70, including portions not shown in the drawings, are the same as corresponding structures in vehicle body forward portion structure 10.

Accordingly, by means of vehicle body forward portion structure 70 according to the second exemplary embodiment, essentially similar effects can be obtained by similar mechanisms to vehicle body forward portion structure 10 according to the first exemplary embodiment. Further, in vehicle body forward portion structure 70, bolts 72 are disposed in close proximity with rear wall 44C of dash cross member 44 and load transmission member 76 is provided at side door 22. As a result, load from dash cross member 44 is transmitted to impact beam 30 via vehicle width direction outer end portion 44B of dash cross member 44, bolts 72, door hinge 24 and load transmission member 76. Accordingly, in vehicle body forward portion structure 70, load accompanying a frontal collision of automobile 11 is transmitted to the beltline portion of side door 22 from the portion at which bracket 46 is provided at the upper part of front pillar lower 14B, and also is efficiently transmitted to impact beam 30 via door hinge 24 at the lower portion of front pillar lower 14B.

Third Exemplary Embodiment

Figure 10:
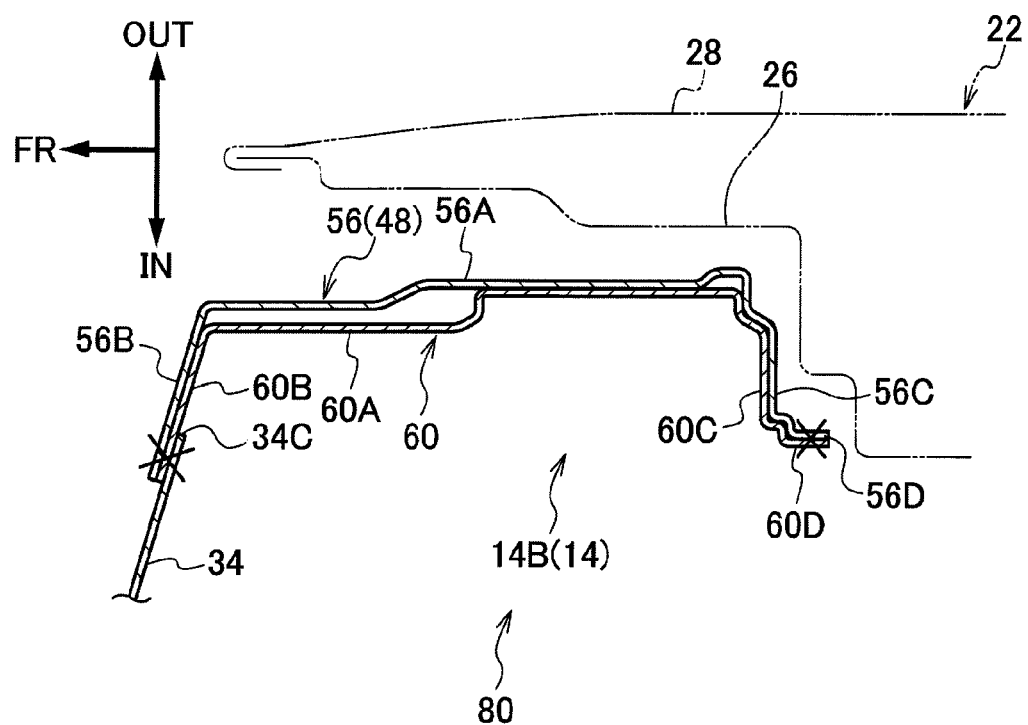
FIG. 10 is a closed cross section of a front pillar lower that is a component of the vehicle body forward portion structure according to a third embodiment of the present invention.

In FIG. 10, the main portion of vehicle body forward portion structure 80 according to a third embodiment of the present invention is shown in plan sectional view corresponding to FIG. 4A of the first exemplary embodiment. As shown in this drawing, vehicle body forward portion structure 80 differs from vehicle body forward portion structures 10 and 70 in respect of the fact that the vehicle width direction outer end portion of dash panel 34 is joined to front wall 60B of pillar reinforcement lower 60.

Specifically, outer end portion 34C in a vehicle width direction of dash panel 34, which extends along a substantially vehicle width direction as seen in plan view, is joined to front wall 60B of pillar reinforcement lower 60 by spot welding. In this embodiment, outer end portion 34C in a vehicle width direction of dash panel 34, and respective front walls 60B and 56B of pillar reinforcement lower 60 and front pillar outer portion 56 are joined by spot welding in a three-layer state.

In addition, in this embodiment, vehicle front side flanges 56D and 60D are not provided at the portion configuring the vehicle lower portion of front pillar lower 14B at front pillar outer portion 56 and pillar reinforcement lower 60. Other portions of the configuration of vehicle body forward portion structure 80, including portions not shown in the drawings, are the same as corresponding structures in vehicle body forward portion structure 10 and vehicle body forward portion structure 70.

Accordingly, by means of vehicle body forward portion structure 80 according to the third exemplary embodiment, essentially similar effects can be obtained by similar mechanisms to vehicle body forward portion structure 10 according to the first exemplary embodiment and vehicle body forward portion structure 70 according to the second exemplary embodiment.

Further, in vehicle body forward portion structure 80, since dash panel 34 and pillar reinforcement lower 60 are joined at a surface along a substantially vehicle width direction as seen in plan view, the joining portion receives load acting in a vehicle width direction at front pillar lower 14B as shearing force. Accordingly, relative to a load that would cause deformation of the vehicle body in a direction such that left and right front pillars 14 fall over in a vehicle width direction substantially in parallel, for example, the joining region between dash panel 34 and pillar reinforcement lower 60 supports the load. As a result, in automobile 11 fitted with vehicle body forward portion structure 80, high vehicle body rigidity can be obtained relative to deformation in a direction such that left and right front pillars 14 would fall over in a vehicle width direction substantially in parallel.

In particular, in vehicle body forward portion structure 80, dash panel 34 is joined directly to thick-plate pillar reinforcement lower 60 of front pillar lower 14B and, in addition, the joining surface has a configuration such that it extends along the vehicle width direction as described above. As a result, compared to a configuration as in vehicle body forward portion structure 500 according to the comparative example, in which the dash panel is joined at a surface of front pillar inner panel 504 facing inward in a vehicle width direction by a joining surface (flange 34A) that extends in a vehicle front-rear direction, vehicle body rigidity relative to deformation in the above-described direction can be greatly improved.

Fourth Exemplary Embodiment

Figure 11:
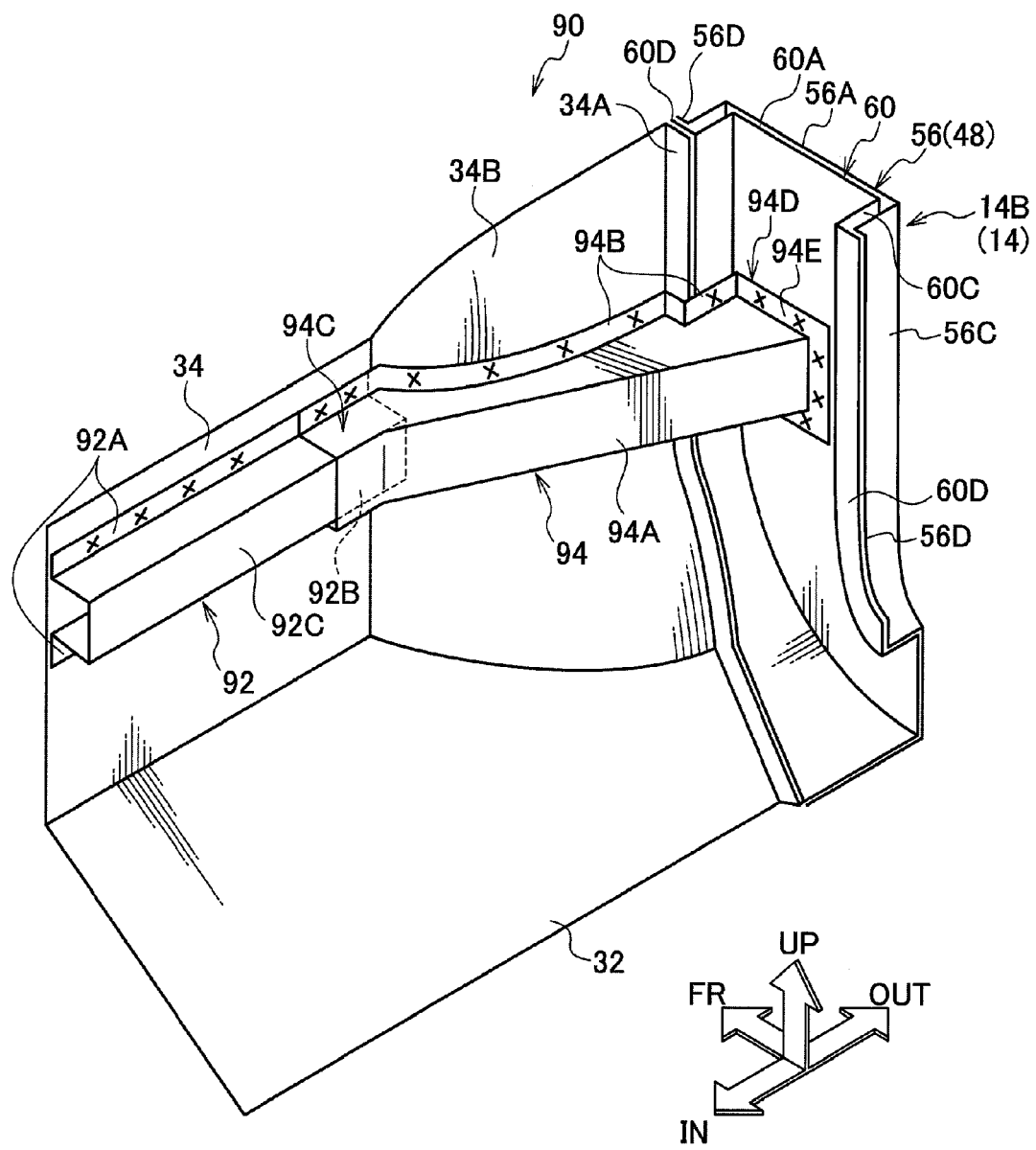
FIG. 11 is a perspective view schematically showing a main portion of the vehicle body forward portion structure according to a fourth embodiment of the present invention.
Figure 12A:
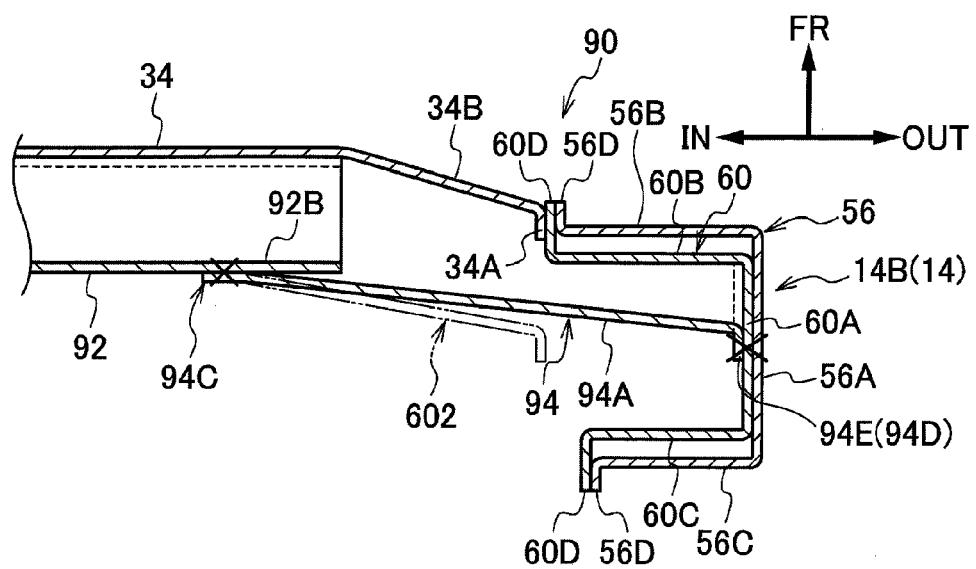
FIG. 12A is a plan sectional view showing a joining configuration of a front pillar lower and a pillar brace in the vehicle body forward portion structure according to a fourth embodiment of the present invention.

In FIG. 11, the main portion of vehicle body forward portion structure 90 according to a fourth embodiment of the present invention is shown schematically in perspective view and, in FIG. 12A, the main portion of vehicle body forward portion structure 90 is shown schematically in plan view. As shown in these drawings, vehicle body forward portion structure 90 differs from vehicle body forward portion structures 10, 70, and 80 according to the first through third exemplary embodiments in respect of the fact that pillar brace 94 is provided as a connecting member between each front pillar lower 14B and dash cross member 92 in place of a configuration where dash cross member 44 directly spans between front pillar lowers 14B at both sides in a vehicle width direction.

Dash cross member 92 is formed in a hat shape with a cross section opening toward the vehicle front, and upper and lower flanges 92A are joined to the rear surface side of dash panel 34 at a portion positioned mainly between bulge portions 34B at either side in a vehicle width direction. As a result, dash cross member 92 forms the framework of a closed cross section structure with dash panel 34. Vehicle width direction outer end portion 92B of dash cross member 92 reaches the vicinity of bulge portion 34B.

Further, pillar brace 94 has substantially flat rear wall 94A that is inclined so as to face both the vehicle rear and inward in a vehicle width direction, and a structure like a substantially triangular truss as seen in plan view is formed by rear wall 94A, dash panel 34 (bulge portion 34B) and front pillar lower 14B. Pillar brace 94 is formed in a hat shape with a cross section opening toward the vehicle front, and upper and lower flanges 94B are joined to dash panel 34 at the rear wall of bulge portion 34B. Further, pillar brace 94 is joined to vehicle width direction outer end portion 92B of dash cross member 92 at inner side join portion 94C, which is provided at an inner end portion thereof in a vehicle width direction. Specifically, inner side join portion 94C is formed in a hat shape with a cross section opening toward the vehicle front, and is joined by spot welding to upper and lower flanges 92A and rear wall 92C of vehicle width direction outer end portion 92B in a state whereby it overlays vehicle width direction outer end portion 92B of dash cross member 92 from the rear surface side.

In addition, pillar brace 94 is joined to bottom wall 60A of pillar reinforcement lower 60 at outer side join portion 94D, which is provided at an outer end portion thereof in a vehicle width direction. Specifically, outer side join portion 94D has flange 94E which juts out upward, downward and rearward from the edges of the opening of pillar brace 94 that faces outward in a vehicle width direction, and flange 94E is joined to bottom wall 60A of pillar reinforcement lower 60 by spot welding. As shown in FIG. 12A, the vehicle rear edge portion of flange 94E is joined to substantially the center portion in a vehicle front-rear direction of bottom wall 60A of pillar reinforcement lower 60. Further, in this embodiment, the outer end portions in a vehicle width direction of upper and lower flanges 94B are joined to front wall 60B of pillar reinforcement lower 60 by spot welding.

As a result of the above, in vehicle body forward portion structure 90, front pillar lowers 14B at either side in a vehicle width direction can be viewed as being bridged by dash cross member 92 and the pair of pillar braces 94. Accordingly, in this embodiment, dash cross member 92 and the pair of pillar braces 94 correspond to a cross member in the present invention. Other portions of the configuration of vehicle body forward portion structure 90, including portions not shown in the drawings, are the same as corresponding structures in vehicle body forward portion structure 10, vehicle body forward portion structure 70 and vehicle body forward portion structure 80.

Accordingly, by means of vehicle body forward portion structure 90 according to the fourth exemplary embodiment, essentially similar effects can be obtained by similar mechanisms to vehicle body forward portion structure 10 according to the first exemplary embodiment, vehicle body forward portion structure 70 according to the second exemplary embodiment and vehicle body forward portion structure 80 according to the third exemplary embodiment, except in respect of the fact that vehicle width direction outer end portions 44B of dash cross member 44 function as bulkheads for front pillar lowers 14B.

Figure 12B:
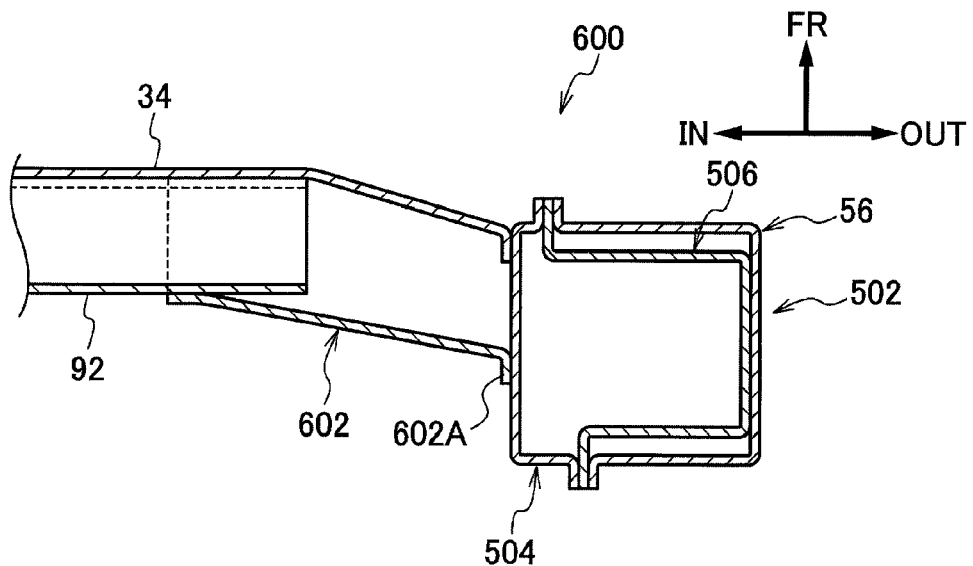
FIG. 12B is a plan sectional view showing a joining configuration of a front pillar lower and a pillar brace in the vehicle body forward portion structure according to a comparative example.
Figure 17:
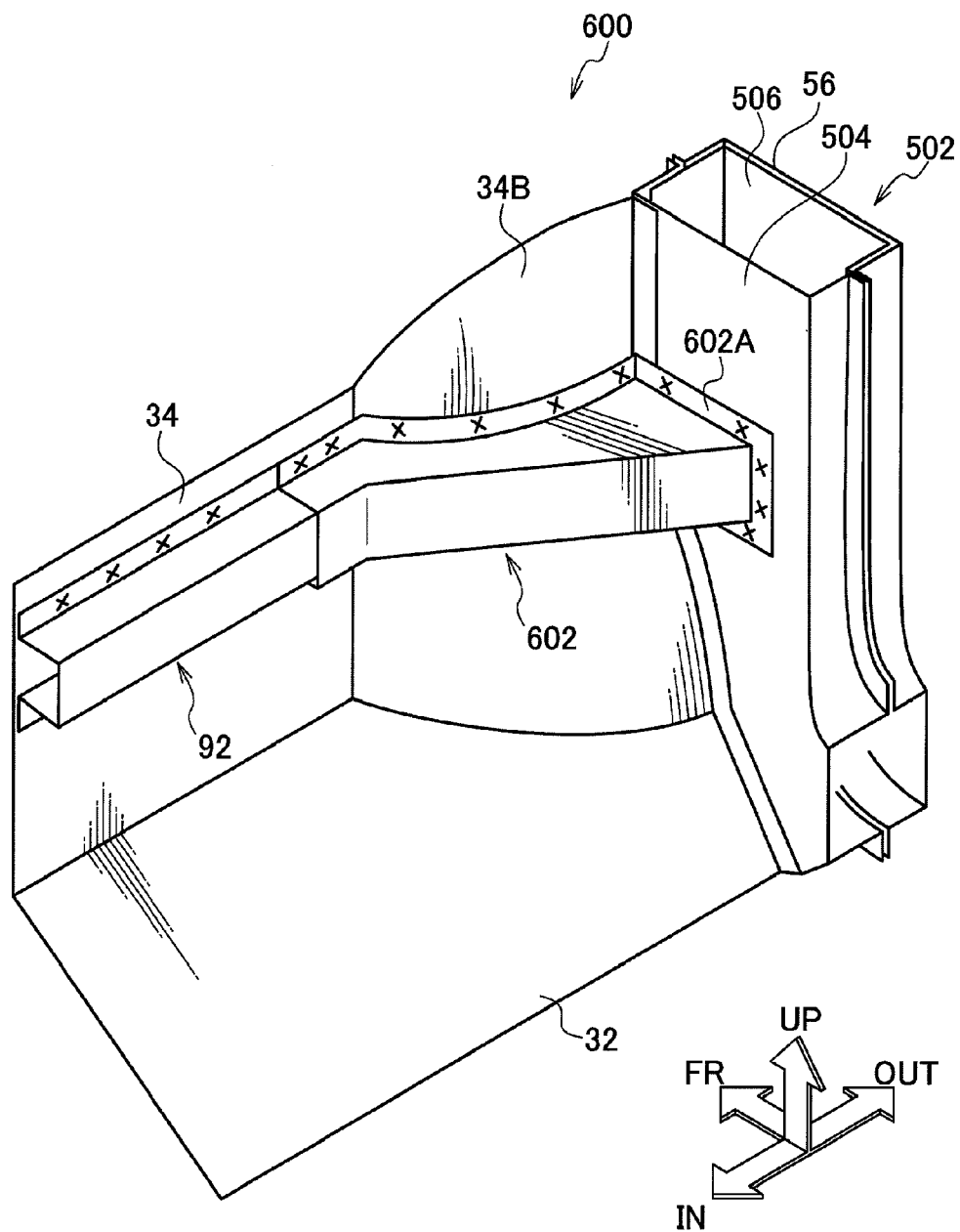
FIG. 17 is a perspective view of a vehicle body forward portion structure according to a different comparative example to that of FIG. 15.

Further mechanisms and effects of vehicle body forward portion structure 90 are explained via comparison with the comparative example shown in FIGS. 12B and 17. In vehicle body forward portion structure 600 shown in FIG. 17, front pillar 502 having a closed cross section structure and dash cross member 92 are linked by pillar brace 602. As also shown in FIG. 12B, flange 602A, which is formed at an outer end in a vehicle width direction of pillar brace 602, is joined to an inner facing surface in a vehicle width direction of front pillar inner panel 504. Because front pillar 502 has a closed cross section structure, this joining is achieved by fastening with a bolt or nut (not shown).

In this regard, in vehicle body forward portion structure 90, pillar brace 94 is directly joined to pillar reinforcement lower 60, which is the high-strength portion of front pillar lower 14B. As a result, load can be transmitted more efficiently from dash cross member 92 to front pillar lower 14B in vehicle body forward portion structure 90 than in vehicle body forward portion structure 600, in which pillar brace 602 is joined to the relatively weak front pillar inner panel 504.

Further, because load can be transmitted efficiently from dash cross member 92 to front pillar lower 14B, there is a high degree of freedom of shape and positioning of pillar brace 94 in vehicle body forward portion structure 90 as compared with pillar brace 602 of vehicle body forward portion structure 600. That is, when securing a similar degree of strength to vehicle body forward portion structure 600, pillar brace 94 (rear wall 94A) can be positioned at the vehicle forward side relative to a position of pillar brace 602 as shown by the imaginary line in FIG. 12A. As a result, foot space for a vehicle occupant can be extended in vehicle body forward portion structure 90 as compared to vehicle body forward portion structure 600. Further, foot space for a vehicle occupant can also be extended in vehicle body forward portion structure 90 as compared to vehicle body forward portion structures 10, 70 and 80, in which vehicle width direction outer end portion 44B of dash cross member 44 is joined to pillar reinforcement lower 60.

In addition, in vehicle body forward portion structure 90, because front pillar lower 14B has an open cross section structure, outer flange 94E of pillar brace 94 can be joined to bottom wall 60A of pillar reinforcement lower 60 by spot welding. As a result, compared to vehicle body forward portion structure 600 in which outer flange 602A is fastened to front pillar 502, assembly processes are simplified.

In addition, in the fourth exemplary embodiment, pillar brace 94 is directly joined to pillar reinforcement lower 60. However, the present invention is not limited to this and, for example, pillar brace 94 may be joined to pillar reinforcement lower 60 via hinge reinforcement 40.

Further, in the fourth exemplary embodiment, there is no portion that functions as a bulkhead at the portion to the rear of front wheel 38 in front pillar lower 14B. However, the present invention is not limited to this and, for example, a bulkhead member that is separate from pillar brace 94 may be provided at the open cross section portion of front pillar lower 14B. Further, for example, in the present invention, the open cross section portion of front pillar lower 14B may be filled in a vehicle front-rear direction by the outer end portion of pillar brace 94 such that this portion functions as a bulkhead.

Figure 13:
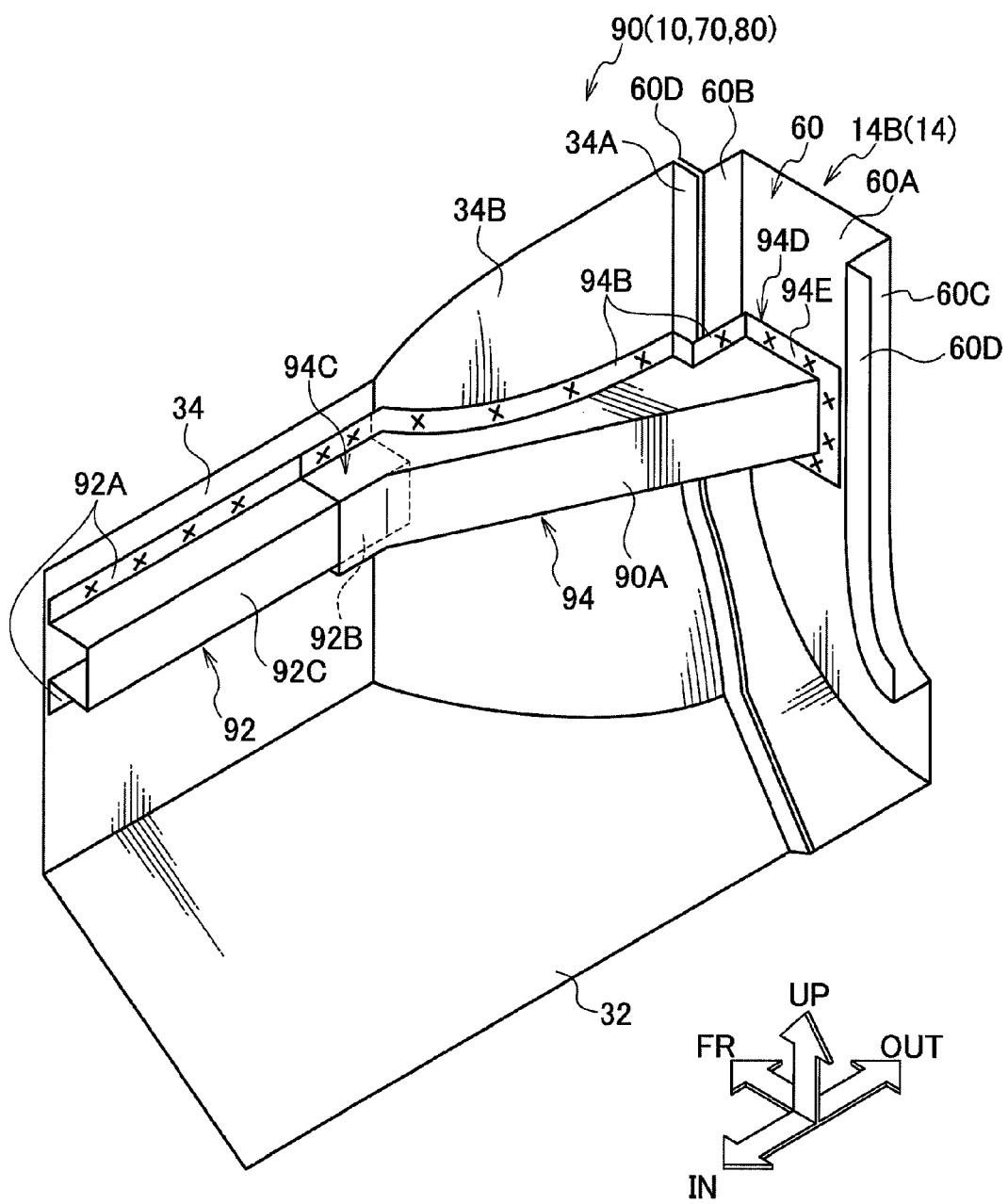
FIG. 13 is a perspective view schematically showing a main portion of the vehicle body forward portion structure according to a variant example of an embodiment of the present invention.
Figure 14:
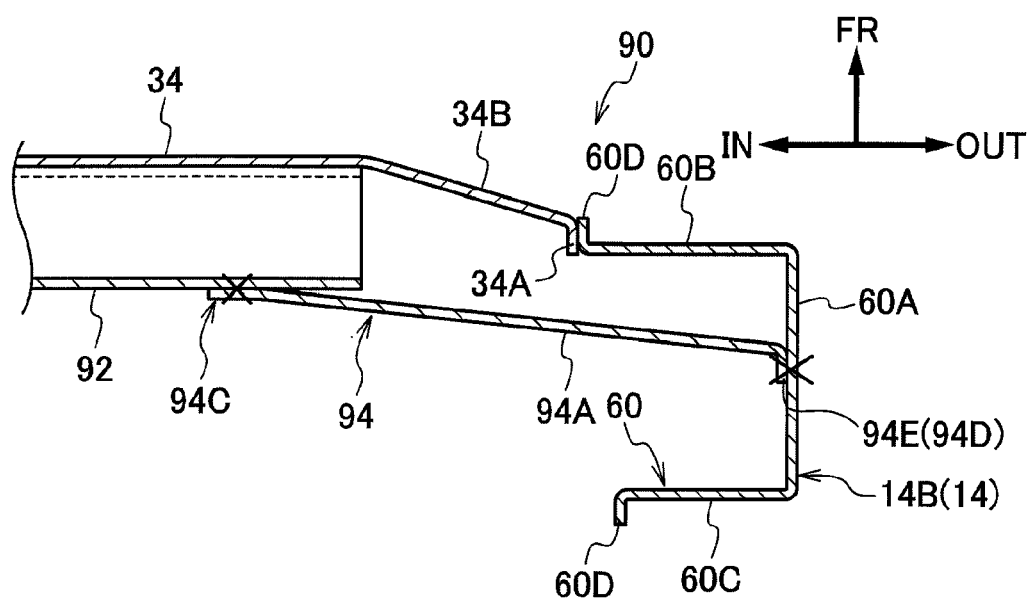
FIG. 14 is a plan sectional view showing the vehicle body forward portion structure according to a variant example of an embodiment of the present invention.

In addition, in the respective embodiments described above, an example has been shown in which front pillar 14 is formed from front pillar outer portion 56 together with pillar reinforcement upper 58 and pillar reinforcement lower 60 such that each cross section in a vehicle vertical direction of front pillar 14 is formed from two members. However, the present invention is not limited to this and, for example, as shown in FIGS. 13 and 14, at least front pillar lower 14B of front pillar 14 may be configured by a single high-strength member corresponding to pillar reinforcement lower 60.

Furthermore, the present invention is not limited to the above-described embodiments or variant examples thereof, and it will be apparent that various alternatives may be practiced without departing from the gist thereof.

The invention claimed is:

1. A vehicle body forward portion structure comprising:
front pillars, at least a lower part of which in a vehicle vertical direction comprises a high-strength portion that is configured by high-tensile steel plate and that extends in the vehicle vertical direction, wherein the front pillars are formed in an overall open cross section shape that opens inward in a vehicle width direction as seen in plan sectional view;
a front-rear load transmission member that is provided between wall portions that are opposed in a vehicle front-rear direction in the open cross section portion of the front pillars positioned at either side in the vehicle width direction and that is capable of transmitting load in the vehicle front-rear direction; and
a cross member that extends in the vehicle width direction, wherein each end of the cross member in the vehicle width direction is joined to the high-strength portion via the front-rear load transmission member so as to span between high-strength portions of the front pillars positioned at either side in the vehicle width direction.

2. A vehicle body forward portion structure comprising:
front pillars, at least a lower part of which in a vehicle vertical direction comprises a high-strength portion that is configured by high-tensile steel plate and that extends in the vehicle vertical direction, wherein the front pillars are formed in an overall open cross section shape that opens inward in a vehicle width direction as seen in plan sectional view; and
a cross member that extends in the vehicle width direction and spans between high-strength portions of the front pillars positioned at either side in the vehicle width direction;
wherein both ends in the vehicle width direction of the cross member are configured to fill open cross section portions of the front pillars at the vehicle rear side of a wheel house so as to be capable of transmitting load in the vehicle front-rear direction.

3. A vehicle body forward portion structure comprising:
front pillars, at least a lower part of which in a vehicle vertical direction comprises a high-strength portion that is configured by high-tensile steel plate and that extends in the vehicle vertical direction, wherein the front pillars are formed in an overall open cross section shape that opens inward in a vehicle width direction as seen in plan sectional view;
a door hinge that is provided at an outer side of the front pillars in the vehicle width direction and that supports a side door;
a fixed member that fixes the door hinge to the high-strength portion of the front pillars and that projects inside the open cross section portion of the front pillars; and
a load transmission member that is provided at the vehicle rear side of the door hinge and at the vehicle front side of a door reinforcement member in the side door, and that overlaps the door hinge and the door reinforcement member in the vehicle width direction and the vehicle vertical direction, respectively;

a cross member that extends in the vehicle width direction and spans between high-strength portions of the front pillars positioned at either side in the vehicle width direction;

wherein both ends in the vehicle width direction of the cross member are configured to fill between a front wall positioned at a front side in the vehicle front-rear direction of open cross section portions of the front pillars and the fixed member so as to be capable of transmitting load in the vehicle front-rear direction.

4. The vehicle body forward portion structure of claim 1, wherein the cross member is provided at a dash panel positioned between the front pillars at either side in the vehicle width direction and comprises a dash cross member having each end thereof in the vehicle width direction joined to the high-strength portions inside the open cross section portions of the front pillars.

5. The vehicle body forward portion structure of claim 1, wherein the cross member comprises:
   a dash cross member provided at a dash panel positioned between the front pillars at either side in the vehicle width direction; and
   a pair of connecting members, each having one end connected to an outer end in the vehicle width direction of the dash cross member and another end connected to the high-strength portion inside the open cross section portion of one of the front pillars.

6. The vehicle body forward portion structure of claim 4, wherein a wall portion of the front pillars that extends in the vehicle width direction is joined to an outer end portion in the vehicle width direction of the dash panel.

7. The vehicle body forward portion structure of claim 6, wherein the wall portion that extends in the vehicle width direction and is joined to an outer end portion in the vehicle width direction of the dash panel is a component of the high-strength portion of the front pillars.

8. The vehicle body forward portion structure of claim 2, wherein the cross member is provided at a dash panel positioned between the front pillars at either side in the vehicle width direction and comprises a dash cross member having each end thereof in the vehicle width direction joined to the high-strength portions inside the open cross section portions of the front pillars.

9. The vehicle body forward portion structure of claim 2, wherein the cross member comprises:
   a dash cross member provided at a dash panel positioned between the front pillars at either side in the vehicle width direction; and
   a pair of connecting members, each having one end connected to an outer end in the vehicle width direction of the dash cross member and another end connected to the high-strength portion inside the open cross section portion of one of the front pillars.

10. The vehicle body forward portion structure of claim 8, wherein a wall portion of the front pillars that extends in the vehicle width direction is joined to an outer end portion in the vehicle width direction of the dash panel.

11. The vehicle body forward portion structure of claim 10, wherein the wall portion that extends in the vehicle width direction and is joined to an outer end portion in the vehicle width direction of the dash panel is a component of the high-strength portion of the front pillars.

12. The vehicle body forward portion structure of claim 3, wherein the cross member is provided at a dash panel positioned between the front pillars at either side in the vehicle width direction and comprises a dash cross member having each end thereof in the vehicle width direction joined to the high-strength portions inside the open cross section portions of the front pillars.

13. The vehicle body forward portion structure of claim 3, wherein the cross member comprises:
   a dash cross member provided at a dash panel positioned between the front pillars at either side in the vehicle width direction; and
   a pair of connecting members, each having one end connected to an outer end in the vehicle width direction of the dash cross member and another end connected to the high-strength portion inside the open cross section portion of one of the front pillars.

14. The vehicle body forward portion structure of claim 12, wherein a wall portion of the front pillar that extends in the vehicle width direction is joined to an outer end portion in the vehicle width direction of the dash panel.

15. The vehicle body forward portion structure of claim 14, wherein the wall portion that extends in the vehicle width direction and is joined to an outer end portion in the vehicle width direction of the dash panel is a component of the high-strength portion of the front pillars.

16. The vehicle body forward portion structure of claim 1, wherein the high-strength portion of the front pillars is formed in a sectional shape that opens inward in the vehicle width direction as seen in plan sectional view.

* * * * *